(12) United States Patent
Yi et al.

(10) Patent No.: US 11,535,638 B2
(45) Date of Patent: Dec. 27, 2022

(54) ARYLAMINOSILANE COMPOUND, PROPYLENE POLYMERIZATION CATALYST AND PREPARATION THEREOF

(71) Applicant: PetroChina Company Limited, Beijing (CN)

(72) Inventors: Jianjun Yi, Beijing (CN); Liang Cui, Beijing (CN); Xilai Zhang, Beijing (CN); Junyu Lei, Beijing (CN); Haijun Hao, Beijing (CN); Shisheng Zhao, Beijing (CN); Kefeng Wang, Beijing (CN); Junpeng Zhuang, Beijing (CN); Shenghui Zhang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 272 days.

(21) Appl. No.: 16/843,476

(22) Filed: Apr. 8, 2020

(65) Prior Publication Data
US 2020/0369689 A1 Nov. 26, 2020

(30) Foreign Application Priority Data
May 23, 2019 (CN) .......................... 201910432626.2

(51) Int. Cl.
*C07F 7/10* (2006.01)
*C08F 10/06* (2006.01)

(52) U.S. Cl.
CPC ................ *C07F 7/10* (2013.01); *C08F 10/06* (2013.01)

(58) Field of Classification Search
None
See application file for complete search history.

(56) References Cited

U.S. PATENT DOCUMENTS

| 4,562,173 A | 12/1985 | Terano et al. |
| 2012/0005918 A1 | 1/2012 | Kim et al. |

FOREIGN PATENT DOCUMENTS

| CN | 1176258 A | 3/1998 |
| CN | 101270172 A | 9/2008 |
| CN | 102453057 A | 5/2012 |
| EP | 2070954 A1 | 6/2009 |
| GB | 1277497 A | 6/1972 |
| JP | 2006274178 A | 10/2006 |
| WO | WO-2017106615 A1 | 6/2017 |

OTHER PUBLICATIONS

Chiara et al. Science of Synthesis, 31b, 1697-1710 (Year: 2007).*
First Office Action and its English translation for Japanese application No. 2020-082285 dated May 18, 2021 which is related to the instant application through a priority claim; 8 pages.
Ikeuchi, Hiroyuki et al.?Study on aminosilane compounds as external electron donors in isospecific propylene polymerization?Journal of Molecular Catalysis A: Chemical, (2003), 193(1-2), 207-215.
Chiara, J. L.?N-silylarylamines?Science of Synthesis,(2007), 31b, 1697-1710.
Magomedov, G. I. et al.?Catalysis by metal carbonyls of the silylation of amines?Zhurnal Obshchei Khimii,(1978), 48(10), 2257-61.
Pennington, Dale A. et al.?Synthesis and catalytic activity of dinuclear imido titanium complexes: the molecular structure of [Ti(NPh)Cl(?-C1)(THF)2]2?Polyhedron, (2005), 24(1), 151-156.
Wannagat, Ulrich et al.?Silicon-nitrogen compounds. X. Mixed silyl and phenyl substituted amines?Zeitschrift fuer Anorganische und Allgemeine Chemie,(1962), 314, 80-90.
Marciniec, Bogdan et al.?Ruthenium-catalyzed dealkenative N-silylation of amines by substituted vinylsilanes?Dalton Transactions,(2015), 44(2), 782-786.
Pikies, J. et al.?Contributions to the chemistry of silicon-sulfur compounds. XXV. Reaction of trialkoxysilanethiols with aromatic amines and preparation of N-(trialkoxysilyl)arylamines?Zeitschrift fuer Anorganische und Allgemeine Chemie, (1982), 489, 211-16.
Bassindale, A. R. et al.?Base-catalyzed solvolysis of N-(trialkylsilyl)anilines?Journal of Organometallic Chemistry,(1972), 43(2), 265-73.
Orita, Akihiro et al.?Reaction of Lithium Silylamides with Carbon Monoxide Leading to arbamoylsilanes?Organometallics,(1994), 13(4), 1533-6.
Chen, IIuai Gu et al.?Mixed copper, zinc 2-amino benzylic organometallics as efficient reagents for the synthesis of heterocycles? Tetrahedron Letters,(1989), 30(36), 4795-8.

(Continued)

*Primary Examiner* — Yun Qian
(74) *Attorney, Agent, or Firm* — Harness, Dickey & Pierce, P.L.C.; Anthony Fussner

(57) ABSTRACT

The present disclosure discloses an arylaminosilane compound, a propylene polymerization catalyst and preparation thereof. The arylaminosilane compound has a structure of

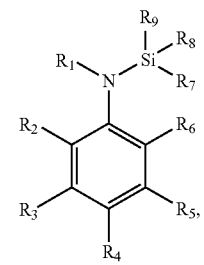

wherein $R_1$ is a $C_1$-$C_8$ alkyl group or a $C_1$-$C_8$ silanyl group; $R_2$, $R_3$, $R_4$, $R_5$ and $R_6$ are each independently H or a $C_1$-$C_{12}$ alkyl group; $R_7$, $R_8$ and $R_9$ are each independently a $C_1$-$C_8$ alkyl group or a $C_1$-$C_8$ alkoxy group. When the arylaminosilane compound is used as an external electron donor of a propylene polymerization catalyst in propylene polymerization reaction, the catalyst has good hydrogen response.

13 Claims, 16 Drawing Sheets

(56) References Cited

OTHER PUBLICATIONS

Lis, A. V. et al.?Reaction of sodium bis(trimethylsilyl)amide with bromotoluenes?Russian Journal of Organic Chemistry,(2015), 51(3), 335-340.
Baston, Eckhard et al.?Dimetalation: the acidity of monometalated arenes towards superbasic reagents?European Journal of Organic Chemistry,(2001), (21), 3985-3989.
RN 1026564-00-0 Registry?Database Registry [Online] Retrieved from STN,Jun. 8, 2008.
Pratt, J. Richard et al.?Organosilicon compounds. XX. Synthesis of aromatic diamines via trimethylsilyl-protecting aniline intermediates? Journal of Organic Chemistry (1975), 40(8), 1090-4.
Yokozawa, Tsutomu et al.?Chain-Growth Polycondensation for Nonbiological Polyamides of Defined Architecture?Journal of the American Chemical Society (2000), 122(34), 8313-8314.
Storozhenko, P. A. et al.?Synthesis of N-and C-trimethylsilyl-substituted anilines?Russian Journal of General Chemistry (2008), 78(5), 892-897.
Yokoyama, Akihiro et al.?Effect of substituent orientation on selectivity between polymerization and cyclization: Polycondensation of (alkylamino)benzoic acid dimer phenyl esters?Macromolecular Rapid Communications (2005), 26(24), 1931-1935.
N-bonded monosilanols: Synthesis and characterization of ArN(SiMe3)SiMe2Cl and ArN(SiMe3)SiMe2OH (Ar=C6H5, 2,6-Me2C6H3, 2,6-iPr2C6H3)?European Journal of Inorganic Chemistry (2005), (10), 1880-1885.
Olivier Mahe et al., Deoxofluorination Reactions Using N, N-Disubstituted Aminodifluorosulfinium Tetrafluoroborate Salts, Olivier Mahe et al., Journal of Fluorine Chemistry, No. 153, Mar. 22, 2013, pp. 57-60.
Hiroyuki Ikeuchi et al., Study on aminosilane compounds as external electron donors in isospecific propylene polymerization, Journal of Molecular Catalysis A: Chemical, No. 193, Mar. 12, 2001, pp. 207-215.
STN, Registry 69230-96-2 et al. Nov. 16, 1984, 19 pages.
Chinese First Office Action and its English machine translation dated Mar. 2, 2022 for counterpart Chinese patent application No. 201910432626.2 that is the parent application to the instant application, 13 pages.
Chinese Search Report and its English machine translation dated Mar. 2, 2022 for counterpart Chinese patent application No. 201910432626.2 that is the parent application to the instant application, 7 pages.
Research progress of silane external electron donors for propylene polymerization, China Synthetiic Resin and Plastics, vol. 35, No. 2, translated abstract included, 2018, 6 pages.
GB/T2412-2008, Plastics-Polypropylene (PP) and propylene copolymer thermoplastics-Determination of isotactic index (and its English translation), Jun. 19, 2008, 8 pages.
GB/T3682-2000, Determination of the melt mass-flow rate (MFR) and the melt volume-flow rate (MVR) of thermoplastics (and its English translation), Oct. 27, 2000, 10 pages.
Chinese International Search Report (and its English translation) for Chinese application No. 201910432626.2 which is the parent application to the instant application, dated Apr. 22, 2019, 9 pages.

* cited by examiner

ARYLAMINOSILANE COMPOUND, PROPYLENE POLYMERIZATION CATALYST AND PREPARATION THEREOF

CROSS-REFERENCE TO RELATED APPLICATION

This application claims priority to Chinese Patent Application No. 201910432626.2, filed on May 23, 2019, which is hereby incorporated by reference in its entirety.

TECHNICAL FIELD

The present disclosure belongs to the field of olefin catalytic polymerization, in particular to an arylaminosilane compound, a propylene polymerization catalyst and preparation thereof.

BACKGROUND OF ART

Solid catalyst with magnesium, titanium, halogen and electron donor as basic components can be used in $CH_2$=CHR propylene polymerization reaction. When used in the polymerization reaction, a co-catalyst alkylaluminum compound and an external electron donor component are added simultaneously. For the directional polymerization of propylene, if no external electron donor is added, the isotacticity of the polymer obtained by most catalysts is low, generally lower than 90%, which is disadvantageous for industrial production and polymer applications. Therefore, for most propylene polymerization catalysts, the addition of an external electron donor plays a very important role.

At present, the types of external electron donors have developed from the original benzoates to the organosiloxanes that are now widely used. For example, US06/675557 discloses a component of an olefin polymerization catalyst, which contains an organosiloxane compound with a general formula of $SiR_m(OR')_{4-m}$, where R is a hydrogen atom, an alkyl group or an aryl group, and R' is an alkyl group or an aryl group, m ranges from 0<m<4. The examples disclosed in this patent show that by using phenyltriethoxysilane as an external electron donor and performing propylene polymerization, the isotacticity of the polypropylene product is significantly higher than that of the ethyl p-methylbenzoate external electron donor in the comparative example. Patent CN96111299.9 discloses a catalyst system and a polymerization method for polymerization and copolymerization of propylene. The catalyst system comprises a combination of a Ziegler-Natta catalyst conventionally supported on a carrier and an external electron donor having a general formula of $SiR_m(OR')_{4-m}$, wherein R is a group selected from alkyl, cycloalkyl, aryl, and vinyl, and R' is an alkyl group; m is 0 to 3, and when R is an alkyl group, R may be the same as R'; when m is 0, 1 or 2, R' groups may be the same or different; when m is 1, 2 or 3, R group may be the same or different. More specifically, the external electron donor of the catalyst system may be selected from cyclohexylmethyldimethoxysilane, diisobutyldimethoxysilane, di-tert-butyldimethoxysilane, cyclohexylisopropyldimethoxysilane or dicyclopentyldimethoxysilane. The catalyst system has a high activity, and can well control the xylene soluble content of the polymer in the range of 0.6 to 3.0 wt %, to obtain a polypropylene product with high crystallinity. The external electron donor is particularly preferably dicyclopentyldimethoxysilane. The examples disclosed in this patent show that as compared with several other external electron donors, dicyclopentyldimethoxysilane has the lowest xylene soluble content and the highest isotacticity in the polymerization product.

Although there are many published patent reports about the organosiloxane external electron donors used in olefin catalytic polymerization, no report has been made on arylaminosilane external electron donors. The present disclosure designs and synthesizes a new type of arylaminosilane compound, and examines their performance as an external electron donor in the polymerization reaction of propylene.

SUMMARY OF INVENTION

Based on the above background of art, the present disclosure provides an arylaminosilane compound, a propylene polymerization catalyst and preparation thereof. The arylaminosilane compound provided by the present disclosure is used as an external electron donor in catalytic propylene polymerization, and has a good hydrogen response.

In order to achieve the above objective, the present disclosure adopts the following technical solutions.

A first aspect of the present disclosure provides an arylaminosilane compound, which has a structure represented by Formula I:

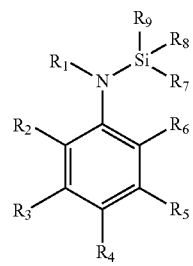

Formula I wherein $R_1$ is a $C_1$-$C_8$ linear or branched alkyl group or a $C_1$-$C_8$ silanyl group;

$R_2$, $R_3$, $R_4$, $R_5$ and $R_6$ are each independently H or a $C_1$-$C_{12}$ linear or branched alkyl group;

$R_7$, $R_8$ and $R_9$ are each independently a $C_1$-$C_8$ linear or branched alkyl group or a $C_1$-$C_8$ linear or branched alkoxy group.

In the arylaminosilane compound of Formula I of the present disclosure, preferably, $R_1$ is methyl, ethyl, propyl, trimethylsilyl, triethylsilyl, dimethylethylsilyl, or methyldiethylsilyl.

In the arylaminosilane compound of Formula I of the present disclosure, preferably, $R_2$, $R_3$, $R_4$, $R_5$ and $R_6$ are each independently H, methyl, ethyl, propyl or isopropyl; they may be the same or different.

In the arylaminosilane compound of Formula I of the present disclosure, preferably, $R_7$, $R_8$ and $R_9$ are each independently methyl, ethyl, n-propyl, isopropyl, methoxy, ethoxy or propoxy; they may be the same or different.

In a preferred embodiment, In the arylaminosilane compound of Formula I of the present disclosure, $R_1$ is methyl or trimethylsilyl; $R_2$, $R_3$, $R_4$, $R_5$ and $R_6$ are each H; or $R_3$, $R_4$ and $R_5$ are each H, $R_2$ and $R_6$ are each isopropyl; $R_7$, $R_8$ and $R_9$ are each independently methyl, methoxy or ethoxy.

The arylaminosilane compounds in the preferred embodiment of the present disclosure are (N-methylanilino)trimethoxysilane, (N-methylanilino)methyldimethoxysilane, (N-methylanilino)triethoxysilane, (N-methylanilino)methyldiethoxysilane, (2,6-diisopropyl-N-trimethylsilylanilino)trimethoxysilane, (2,6-diisopropyl-N- trimethylsilylanilino)methyldimethoxysilane, (2,6-diisopropyl-N-trimethylsilylanilino)triethoxysilane, or (2,6-diisopropyl-N-trimethylsilylanilino)methyldiethoxysilane.

A second aspect of the present disclosure provides a method for preparing the above-mentioned arylaminosilane compound, as in reaction scheme 1:

Reaction scheme 1

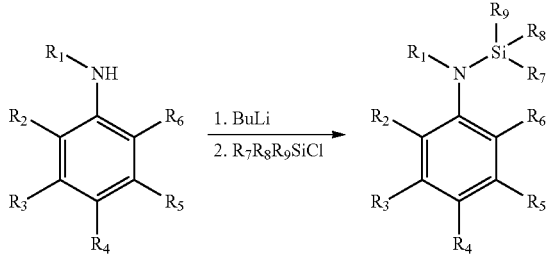

The preparation method includes the following steps:

reacting an arylamine represented by Formula II with an alkyl lithium in an organic solvent under a protective gas atmosphere at −80° C. to 30° C.; adding $R_7R_8R_9SiCl$ to the reaction system without separation and reacting at −80° C. to 30° C., so as to obtain the arylaminosilane compound after the completion of the reaction;

Formula II

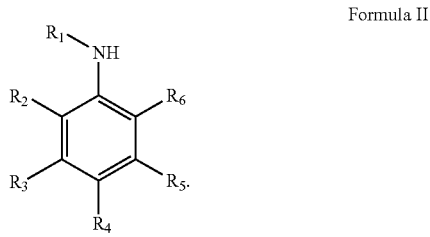

The arylamine represented by formula II is reacted with a strong base such as butyl lithium to form an amine lithium salt compound, which is directly reacted with $R_7R_8R_9SiCl$ without separation to obtain the arylaminosilane compound represented by formula I.

In the method for preparing an arylaminosilane compound provided by the second aspect of the present disclosure, preferably, the molar ratio of the arylamine to the alkyl lithium is 1:(1 to 3).

In the method for preparing an arylaminosilane compound provided by the second aspect of the present disclosure, preferably, the molar ratio of the arylamine to $R_7R_8R_9SiCl$ is 1:(1 to 3).

In the method for preparing an arylaminosilane compound provided by the second aspect of the present disclosure, preferably, arylamine is reacted with the alkyl lithium for 1 to 48 hours; after the addition of $R_7R_8R_9SiCl$, the reaction is carried out for 1 to 48 hours.

In the method for preparing an arylaminosilane compound provided by the second aspect of the present disclosure, preferably, the arylamine is N-methylaniline, N-ethylaniline, N-propylaniline, N-methyl-2,6-diisopropylaniline, N-methyl-2,6-dimethylaniline, N-methyl-2,4,6-trimethylaniline, N-methyl-2,4,6-triisopropylaniline, N-ethyl-2,6-diisopropylaniline, N-ethyl-2,6-dimethylaniline, N-ethyl-2,4,6-trimethylaniline, N-ethyl-2,4,6-triisopropylaniline, 2,6-diisopropyl-N-trimethyl silyl aniline, 2,6-dimethyl-N-trimethylsilylaniline, 2,4,6-trimethyl-N-trimethylsilylaniline or 2,4,6-triisopropyl-N-trimethylsilylaniline.

In the method for preparing an arylaminosilane compound provided by the second aspect of the present disclosure, preferably, the $R_7R_8R_9SiCl$ is $(CH_3O)_3SiCl$, $(C_2H_5O)_3SiCl$, $CH_3(CH_3O)_2SiCl$, $CH_3(C_2H_5O)_2SiCl$, $(C_3H_7O)_3SiCl$, $(C_4H_9O)_3SiCl$, $(CH_3O)(C_2H_5O)_2SiCl$, $(C_2H_5O)_3SiCl$, $(CH_3O)(C_3H_7O)_2SiCl$, $(CH_3O)(C_2H_5O)(C_3H_7O)SiCl$, $CH_3(C_3H_7O)_2SiCl$, $CH_3(C_4H_9O)_2SiCl$, $C_2H_5(CH_3O)_2SiCl$, $C_2H_5(C_2H_5O)_2SiCl$, $C_2H_5(C_3H_7O)_2SiCl$ or $C_2H_5(C_4H_9O)_2SiCl$.

In the method for preparing an arylaminosilane compound provided by the second aspect of the present disclosure, preferably, the alkyl lithium is butyl lithium, more preferably n-butyl lithium.

In the method for preparing an arylaminosilane compound provided by the second aspect of the present disclosure, preferably, the protective gas is nitrogen, helium, or argon.

In the method for preparing an arylaminosilane compound provided by the second aspect of the present disclosure, the organic solvent is not particularly limited. Preferably, the organic solvent is one or a mixed solvent of several of toluene, benzene, diethyl ether, tetrahydrofuran, pentane, hexane, heptane, and octane. More preferably, the organic solvent is tetrahydrofuran or toluene.

The third aspect of the present disclosure also provides another method for preparing the arylaminosilane compound, as in reaction scheme 2 and reaction scheme 3:

Reaction scheme 2

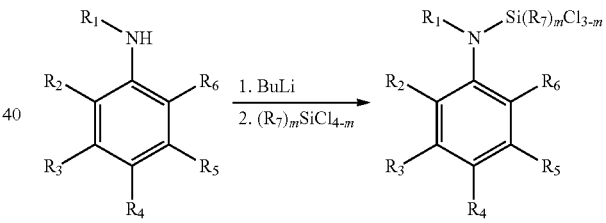

Reaction scheme 3

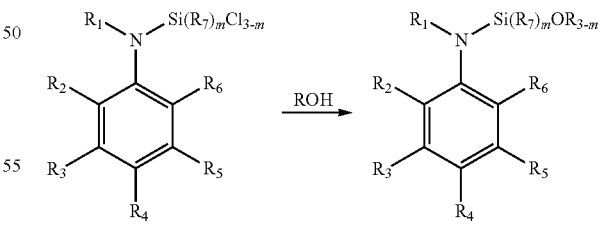

The preparation method includes the following steps:

reacting an arylamine represented by Formula II with an alkyl lithium in an organic solvent under a protective gas atmosphere at −80° C. to 30° C.; adding $(R_7)_mSiCl_{4-m}$ to the reaction system without separation to continue the reaction, to obtain an intermediate represented by Formula III after the completion of the reaction; wherein $R_7$ is methyl and m is 0 or 1;

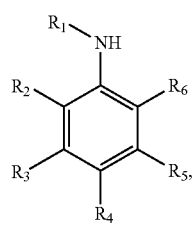

Formula II

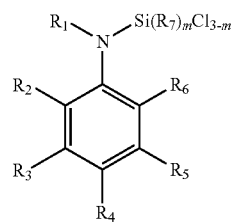

Formula III dissolving the intermediate represented by Formula III in an organic solvent, adding ROH thereto, and reacting at a temperature of 0° C. to 60° C. to obtain a compound represented by Formula IV;

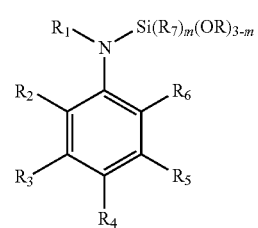

Formula IV wherein R is a $C_1$-$C_8$ alkyl group.

In the method for preparing an arylaminosilane compound provided by the third aspect of the present disclosure, preferably, the arylamine is reacted with the alkyl lithium for 1 to 48 hours, preferably 2 hours; $(R_7)_m SiCl_{4-m}$ is added to continue the reaction for 24 hours; the intermediate of formula III is reacted with ROH for 4-60 hours.

In the method for preparing an arylaminosilane compound provided by the third aspect of the present disclosure, the molar ratio of the arylamine to the alkyl lithium is 1:(1 to 3).

In the method for preparing an arylaminosilane compound provided by the third aspect of the present disclosure, the molar ratio of the arylamine to $(R_7)_m SiCl_{4-m}$ is 1:(1 to 3).

In the method for preparing an arylaminosilane compound provided by the third aspect of the present disclosure, the molar ratio of the intermediate of formula III to ROH is 1:(1 to 100).

In the method for preparing an arylaminosilane compound provided by the third aspect of the present disclosure, m is 1 and R is methyl or ethyl.

In the method for preparing an arylaminosilane compound provided by the third aspect of the present disclosure, preferably, the alkyl lithium is butyl lithium, more preferably n-butyl lithium.

In the method for preparing an arylaminosilane compound provided by the third aspect of the present disclosure, preferably, the protective gas is nitrogen, helium, or argon.

In the method for preparing an arylaminosilane compound provided by the third aspect of the present disclosure, the organic solvent is not particularly limited. Preferably, the organic solvent is one or a mixed solvent of several of toluene, benzene, diethyl ether, tetrahydrofuran, pentane, hexane, heptane and octane. More preferably, the organic solvent is tetrahydrofuran or toluene.

The arylamine of formula II in the above preparation method can be synthesized by reaction scheme 4:

Reaction scheme 4

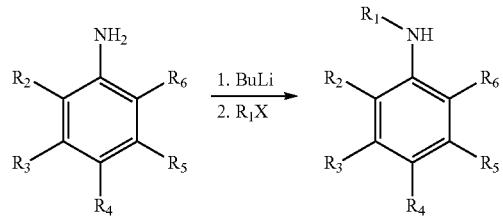

The reaction temperature may be in a range of −80° C. to 30° C. The reaction time of the two steps may be from 1 to 48 hours. The reaction temperature in the first step is preferably 0° C.-10° C., and the reaction time is preferably 2-4 hours; the reaction temperature in the second step is preferably 25° C.-30° C., and the reaction time is 24-30 hours. The lithium salt produced in the first step may be separated and purified by concentration and crystallization. Since this type of lithium salt is extremely sensitive to air, it is directly reacted with $R_1X$ without separation in the present disclosure. In $R_1X$, $R_1$ is as defined in Formula I, and X is chlorine or bromine.

The reactions involved in the above reaction schemes 1 to 4 are all anhydrous and anaerobic reactions, and are performed in a vacuum line or a glove box by using Schlenk technology. All solvents used are subjected to an anhydrous and anaerobic treatment. The solvents such as tetrahydrofuran, n-hexane, and toluene used in the entire experimental process must be subjected to conventional degassing and dehydration treatments; this will not be particularly described in the reaction examples.

A fourth aspect of the present disclosure provides a propylene polymerization catalyst. The propylene polymerization catalyst includes a solid titanium catalyst component, an alkyl aluminum compound component, and the above arylaminosilane compound component.

In the propylene polymerization catalyst, preferably, the ratio of the components in the propylene polymerization catalyst is 1:(5 to 1000):(1 to 500) in terms of the molar ratio of titanium:aluminum:silicon. It is more preferably 1:(50 to 150):(5 to 50).

In the propylene polymerization catalyst of the present disclosure, preferably, the general formula of the alkyl aluminum compound is $AlR_n X_{(3-n)}$, where R is hydrogen or a $C_1$-$C_{20}$ alkyl group, aralkyl group, or aryl group; X is halogen; n is an integer of 1 to 3. More preferably, the alkyl aluminum compound is trimethylaluminum, triethylaluminum, triisobutylaluminum, trioctylaluminum, diethylaluminum hydride, diisobutylaluminum hydride, chlorodiethylaluminum, chlorodiisobutylaluminum or dichloroethylaluminum.

In the propylene polymerization catalyst of the present disclosure, preferably, the solid titanium catalyst is a solid titanium catalyst containing titanium, magnesium, and halogen as main components.

In the propylene polymerization catalyst of the present disclosure, preferably, the solid titanium catalyst containing titanium, magnesium, and halogen as main components refers to magnesium halide, and a titanium compound having at least one Ti-halide bond and an internal electron donor compound supported thereon.

In the propylene polymerization catalyst of the present disclosure, preferably, the internal electron donor compound is a polycarboxylic acid ester, an acid anhydride, a ketone, an ether, or a sulfonyl compound.

In the propylene polymerization catalyst of the present disclosure, preferably, the solid titanium catalyst containing titanium, magnesium, and halogen as main components can be prepared by the following two methods:

the first method: magnesium halide alcoholate is obtained from an alcohol, magnesium halide, and a hydrocarbon solvent in the presence of a carboxylic anhydride compound, and then the homogeneous solution of the alcoholate is contacted with the liquid titanium compound at low temperature, and then the temperature is increased. Based on the precipitation of magnesium halide in the titanium compound from low temperature to high temperature, there is a recrystallization process. During the temperature increasing process, a certain amount of internal electron donor compound is added for reaction, and the temperature is continuously increased. When the reaction temperature is reached, a certain amount of internal electron donor compound is added again to continue the reaction, and the solid titanium catalyst is obtained by filtering, washing and drying.

the second method: Spherical magnesium chloride alcoholate particles of the general formula $MgCl_2 \cdot nROH$ are added to a titanium tetrachloride solution at a low temperature and reacted for a period of time; the temperature is gradually increased to 40-100° C. and one or two internal electron donors are added to continue the reaction for a period of time; after filtration, a certain amount of titanium tetrachloride is added to react for a period of time, and the steps of adding titanium tetrachloride and filtering may be repeated 1 to 3 times; finally it is washed with an inert hydrocarbon solvent and dried to obtain a spherical solid catalyst.

A fifth aspect of the present disclosure provides use of the above arylaminosilane compound or a propylene polymerization catalyst in a propylene polymerization reaction.

The propylene polymerization and copolymerization of the present disclosure are performed according to a method known in the art, and are operated in a liquid phase bulk or a solution of the bulk in an inert solvent, or in a gas phase, or by a combined polymerization process in a gas-liquid phase. The polymerization temperature is generally 0° C. to 150° C., and preferably 50° C. to 100° C. The polymerization pressure is normal pressure or higher.

The arylaminosilane compound of the present disclosure may be used as an external electron donor for catalytic propylene polymerization and have a good hydrogen response.

DETAILED DESCRIPTION

In order to explain the present disclosure more clearly, the present disclosure is further described below with reference to preferred examples. Those skilled in the art should understand that what is specifically described below is illustrative and not restrictive, which should not limit the protection scope of the present disclosure.

Test Methods:

1. The structure of the synthesized external donor compound is determined by nuclear magnetic resonance method.

2. The isotacticity of the polymerization product is determined by a method of boiling n-heptane extraction according to the national standard GB/T 2412-2008.

3. The melt index of the polymer product is determined according to the national standard GB/T 3682-2000.

EXAMPLE 1

(1) Synthesis of (N-methylanilino)trimethoxysilane 8 g of N-methylaniline and 80 mL of THF were added to a 200 mL Schlenk flask. The temperature was dropped to 0° C., and 60 mL of n-butyl lithium (1.6 M solution in n-hexane) was slowly added dropwise. After 2 hours of reaction, 15 g of trimethoxychlorosilane was added dropwise, and the reaction mixture was naturally warmed to room temperature and reacted for 24 hours. The solvent was removed by vacuo, and 100 mL of n-hexane was added for filtration. Then n-hexane was removed by vacuo, and the residue was subjected to distillation under reduced pressure, and a fraction of 140-141° C. was collected to give 8.2 g of yellow liquid with a yield of 42%.

$^1$H NMR (400 MHz, CDCl$_3$, 25° C., TMS): δ(ppm) 7.28 (t, 2H, $^3J_{H-H}$=8.0 Hz, Ar—H), 7.10 (d, 2H, $^3J_{H-H}$=8.0 Hz, Ar—H), 6.90 (t, 1H, $^3J_{H-H}$=8.0 Hz, Ar—H), 3.64 (s, 3H, N(OCH$_3$), 3.62 (s, 6H, N(OCH$_3$), 3.06 (s, 3H, NCH$_3$).

Figure 1:
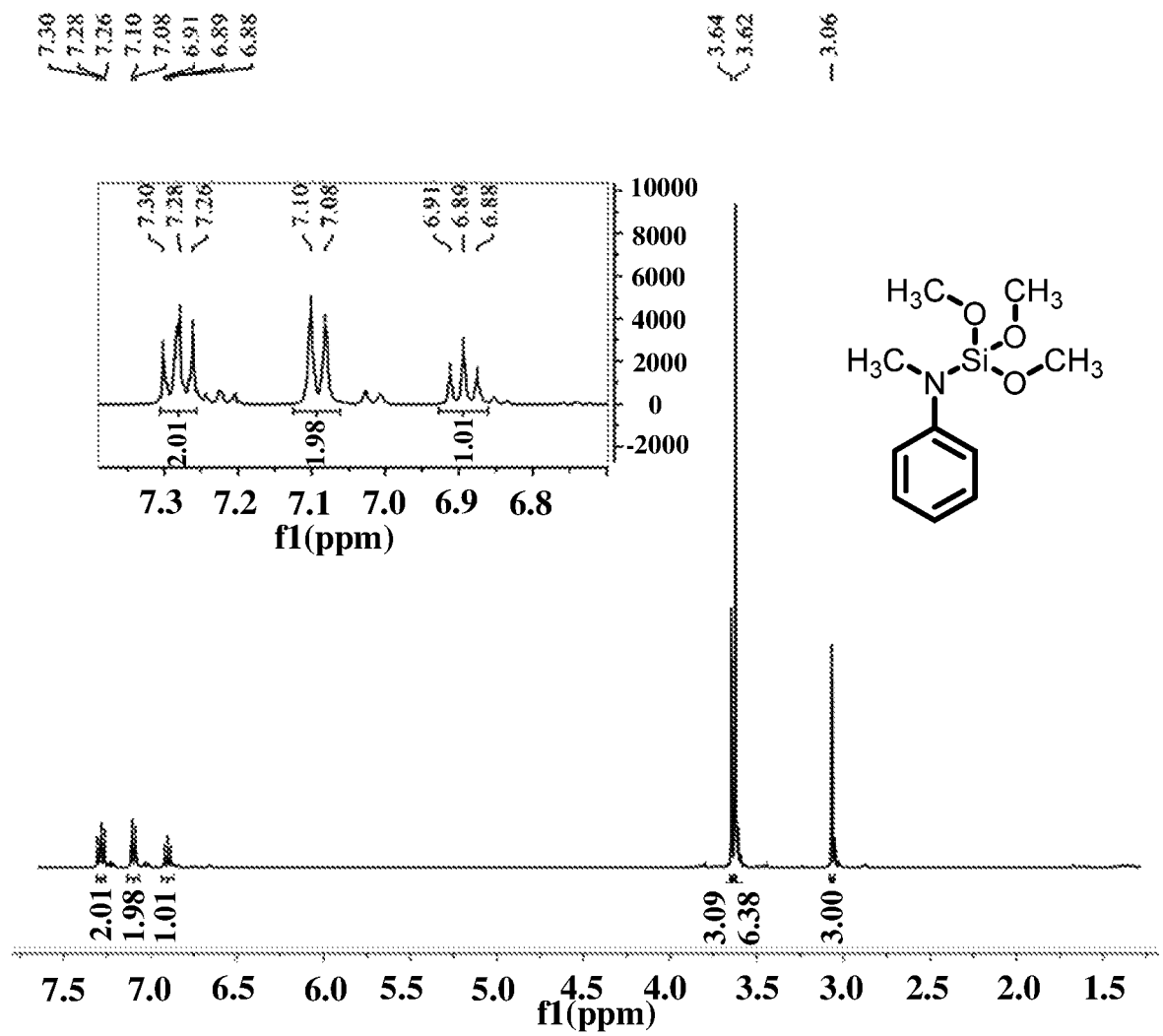
FIG. 1 is a $^1H$ NMR spectrum of (N-methylanilino)trimethoxysilane in Example 1 of the present disclosure.
Figure 2:
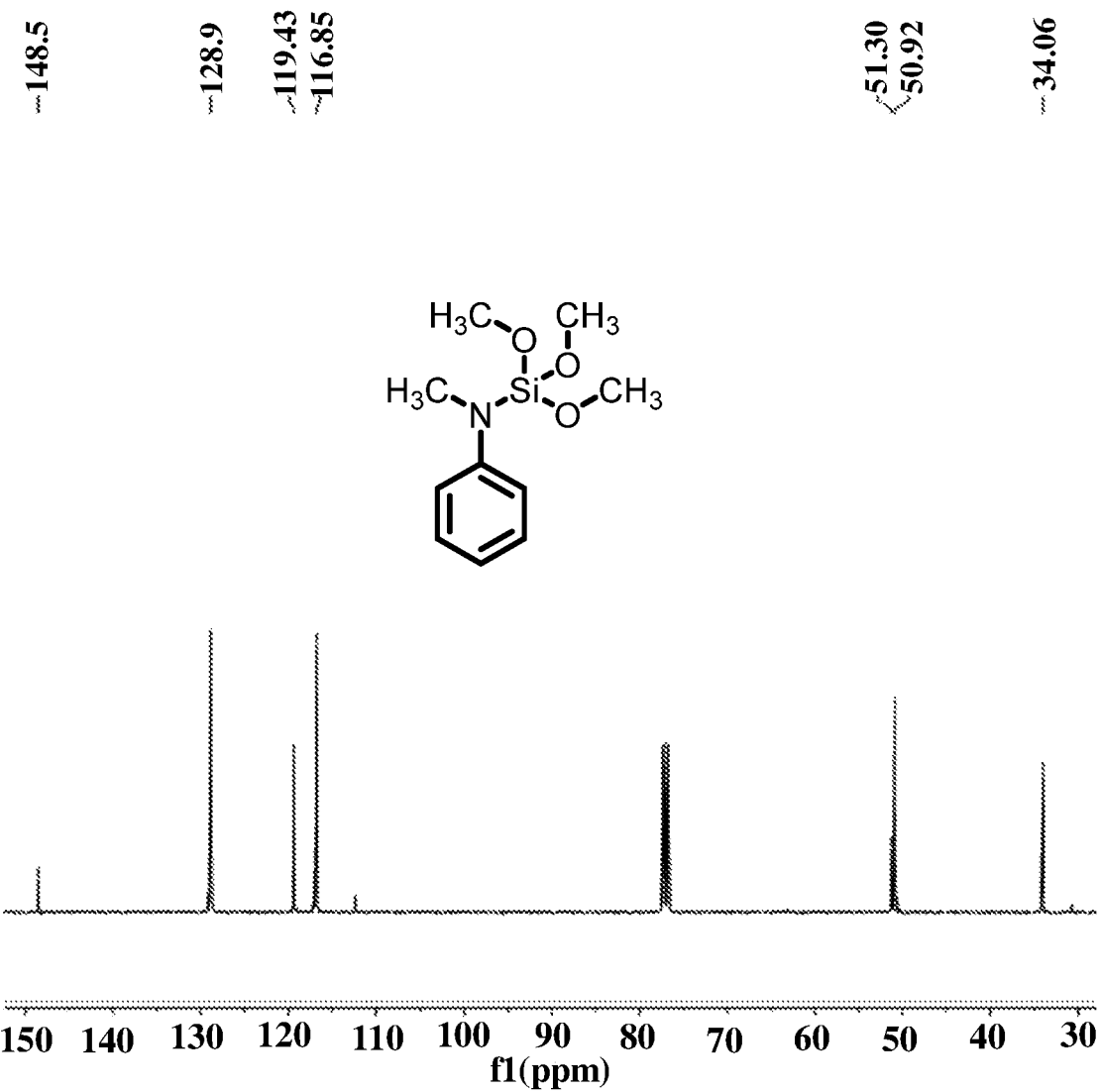
FIG. 2 is a $^{13}C$ NMR spectrum of (N-methylanilino)trimethoxysilane in Example 1 of the present disclosure.

$^{13}$C NMR (400 MHz, CDCl$_3$, 25° C., TMS): δ(ppm) 148.50, 128.90, 119.43, 51.30, 50.92, 34.06. NMR spectra are shown in FIGS. 1 and 2.

(2) Preparation of Titanium-Containing Solid Catalyst 5.0 g of MgCl$_2$·2.85C$_2$H$_5$OH spherical support was added to a glass reaction flask containing 150 mL of TiCl$_4$ and pre-cooled to 25° C. with stirring, gradually warmed to 80° C., and 2 mmol of internal electron donor diisobutyl phthalate was added. The temperature was kept for 30 minutes, and then the temperature was raised to 130° C. to react for 2 hours. It was filtered, and 120 mL of TiCl$_4$ was added, and it was reacted at 130° C. for 2 hours, and filtered. The above steps of adding TiCl$_4$ and filtering were repeated once. It was washed with n-hexane for six times. Finally, the solid was dried under vacuum to obtain 3.2 g of the spherical solid catalyst component of the present disclosure.

(3) Propylene Polymerization Experiment

A stainless steel reactor with a volume of 2 L was fully substituted with gas propylene, and then 5 mL of a triethylaluminum solution with a concentration of 2.4 mol/L, 0.9 mmol of the synthesized external electron donor compound N-methylanilinotrimethoxysilane, and 30 mg of the titanium-containing solid catalyst component prepared above were sequentially added, and 500 g of liquid propylene was introduced. The temperature was raised to 70° C., and the reaction was maintained at this temperature for 0.5 hour. The temperature was lowered and the pressure was released to obtain a polypropylene product. The results of the catalyst polymerization experiment are shown in Table 1.

EXAMPLE 2

(1) Synthesis of (N-methylanilino)methyldimethoxysilane:

10 g of N-methylaniline and 80 mL of THF were added to a 200 mL Schlenk flask. The temperature was dropped to 0° C., and 60 mL of n-butyl lithium (1.6 M solution in n-hexane) was slowly added dropwise. After 2 hours of reaction, 16 g of methyl dimethoxychlorosilane was added dropwise, and the reaction mixture was naturally warmed to 25° C. and reacted for 24 hours. The solvent was removed by vacuo, and 100 mL of n-hexane was added for filtration. Then n-hexane was removed by vacuo, and the residue was subjected to distillation under reduced pressure to give 8.8 g of yellow liquid with a yield of 49%.

$^1$H NMR (400 MHz, CDCl$_3$, 25° C., TMS): δ(ppm) 7.28 (t, 2H, $^3J_{H-H}$=8.0 Hz, Ar—H), 7.10 (d, 2H, $^3J_{H-H}$=8.0 Hz, Ar—H), 6.90 (t, 1H, $^3J_{H-H}$=8.0 Hz, Ar—H), 3.64 (s, 3H, N(OCH$_3$), 3.62 (s, 6H, N(OCH$_3$), 3.06 (s, 3H,NCH$_3$).

Figure 3:
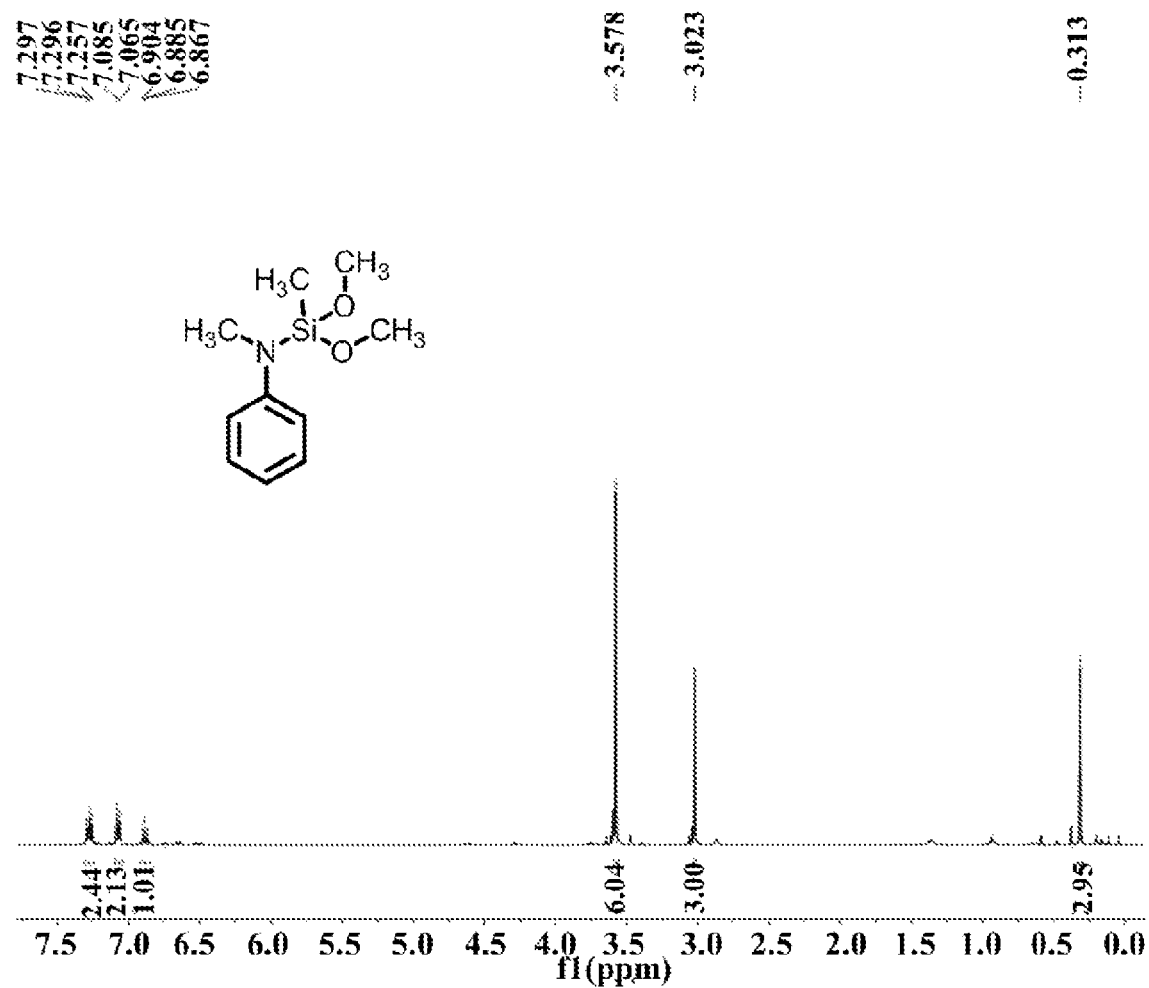
FIG. 3 is a $^1H$ NMR spectrum of (N-methylanilino)methyldimethoxysilane in Example 2 of the present disclosure.
Figure 4:
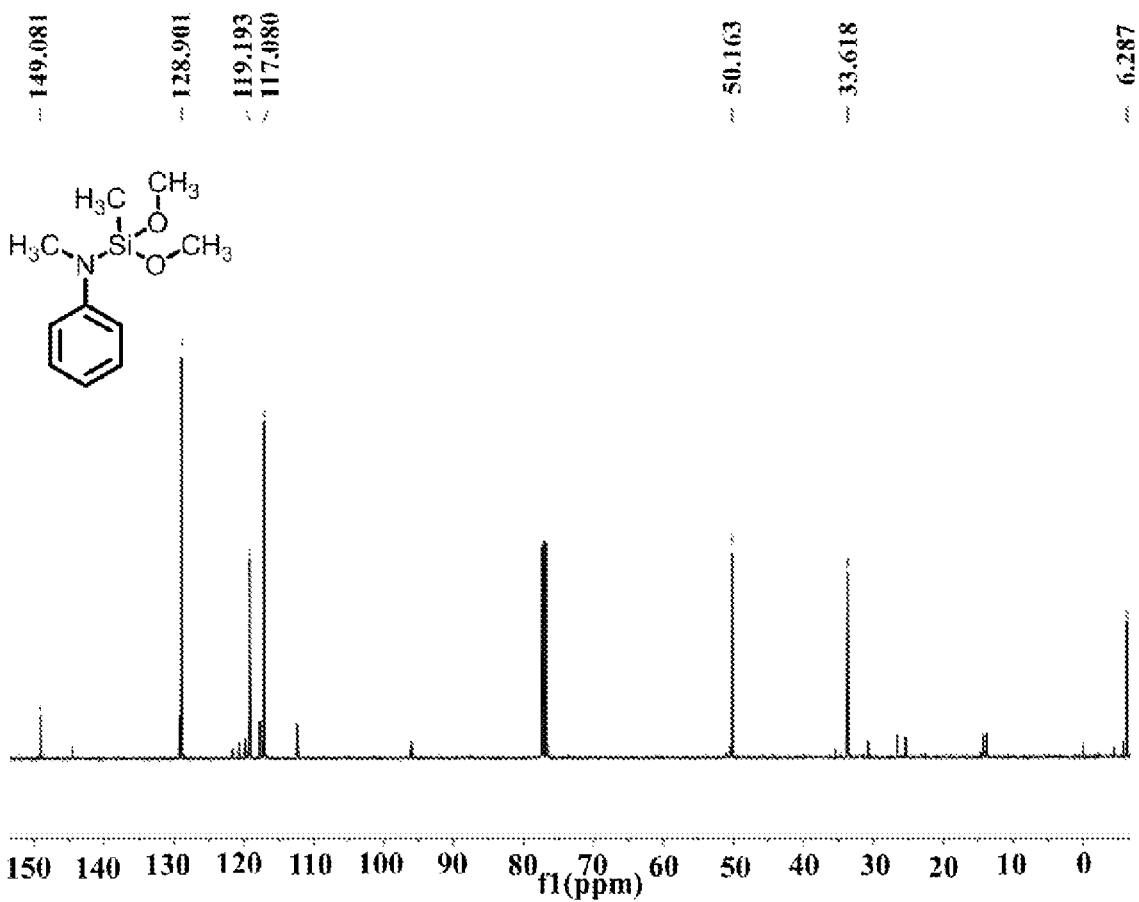
FIG. 4 is a $^{13}C$ NMR spectrum of (N-methylanilino)methyldimethoxysilane in Example 2 of the present disclosure.

$^{13}$C NMR (400 MHz, CDCl$_3$, 25° C., TMS): δ(ppm) 148.50, 128.90, 119.43, 51.30, 50.92, 34.06. NMR spectra are shown in FIGS. 3 and 4.

(2) Preparation of Titanium-Containing Solid Catalyst: the Same as in Example 1.

(3) Propylene Polymerization Experiment

A stainless steel reactor with a volume of 2 L was fully substituted with gas propylene, and then 5 mL of a triethylaluminum solution with a concentration of 2.4 mol/L, 0.9 mmol of the synthesized external electron donor compound N-(methylanilino)methyldimethoxysilane, and 30 mg of the titanium-containing solid catalyst component prepared above were sequentially added, and 500 g of liquid propylene was introduced. The temperature was raised to 70° C., and the reaction was maintained at this temperature for 0.5 hour. The temperature was lowered and the pressure was released to obtain a polypropylene product. The results of the catalyst polymerization experiment are shown in Table 1.

EXAMPLE 3

(1) Synthesis of (N-methylanilino)triethoxysilane:

6.5 g of N-methylaniline and 50 mL of THF were added to a 200 mL Schlenk flask. The temperature was dropped to 0° C., and 50 mL of n-butyl lithium (1.6 M solution in n-hexane) was slowly added dropwise. After 2 hours of reaction, 18 g of triethoxychlorosilane was added dropwise, and the reaction mixture was naturally warmed to 25° C. and reacted for 24 hours. The solvent was removed by vacuo, and 100 mL of n-hexane was added for filtration. Then n-hexane was removed by vacuo, and the residue was subjected to distillation under reduced pressure to give 8.5 g of orange liquid with a yield of 51%.

$^1$H NMR (400 MHz, CDCl$_3$, 25° C., TMS): δ(ppm) 7.22 (t, 2H, $^3J_{H-H}$=6.8 Hz, Ar—H), 7.07 (d, 2H, $^3J_{H-H}$=8.8 Hz, Ar—H), 6.83 (t, 1H, $^3J_{H-H}$=8.0 Hz, Ar—H), 3.83 (q, 6H, $^3J_{H-H}$7.2 Hz, OCH$_2$CH$_3$), 3.02 (s, 3H, NCH$_3$), 1.22 (t, 9H, $^3J_{H-H}$=6.8 Hz, OCH$_2$CH$_3$).

Figure 5:
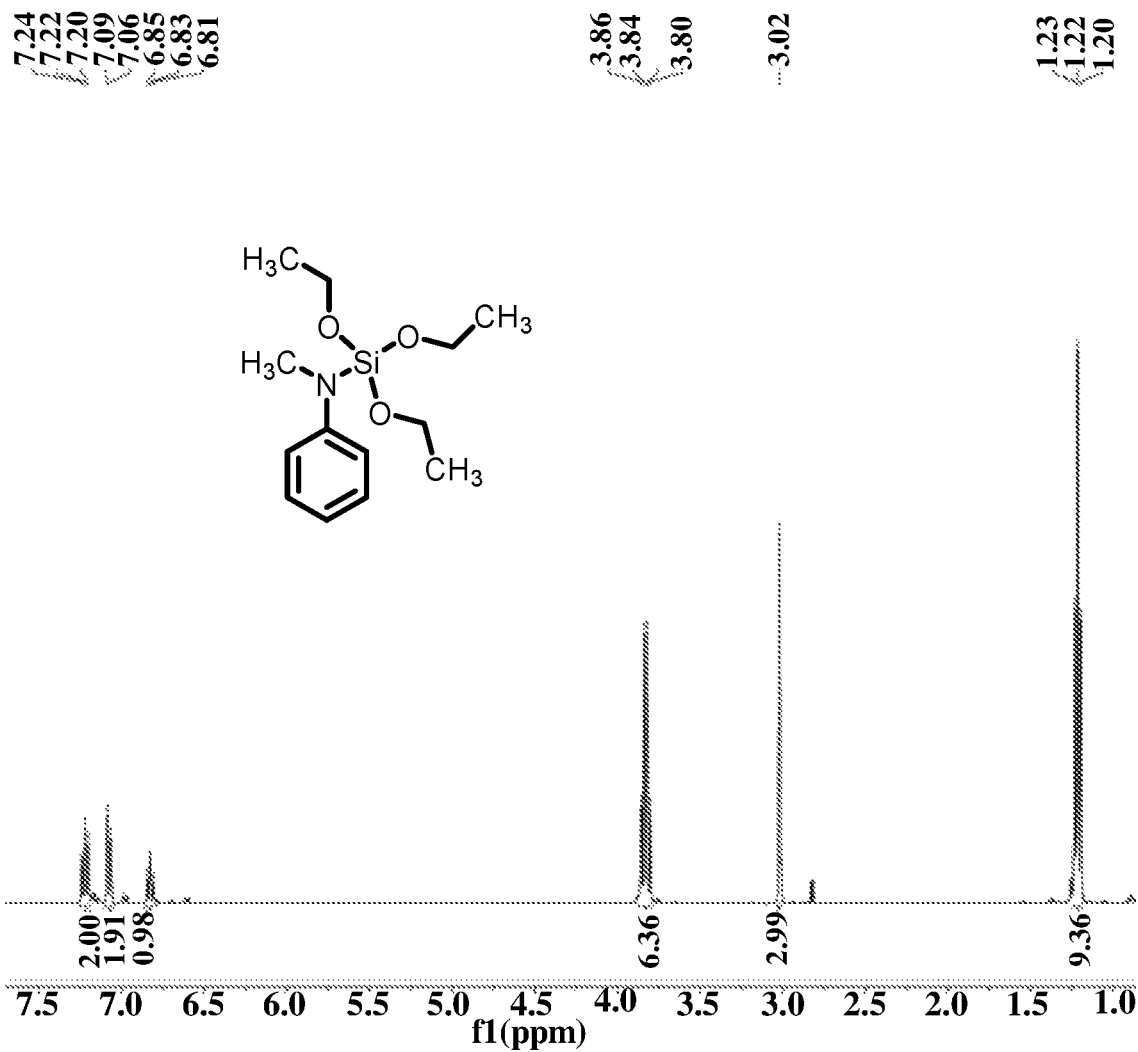
FIG. 5 is a $^1H$ NMR spectrum of (N-methylanilino)triethoxysilane in Example 3 of the present disclosure.
Figure 6:
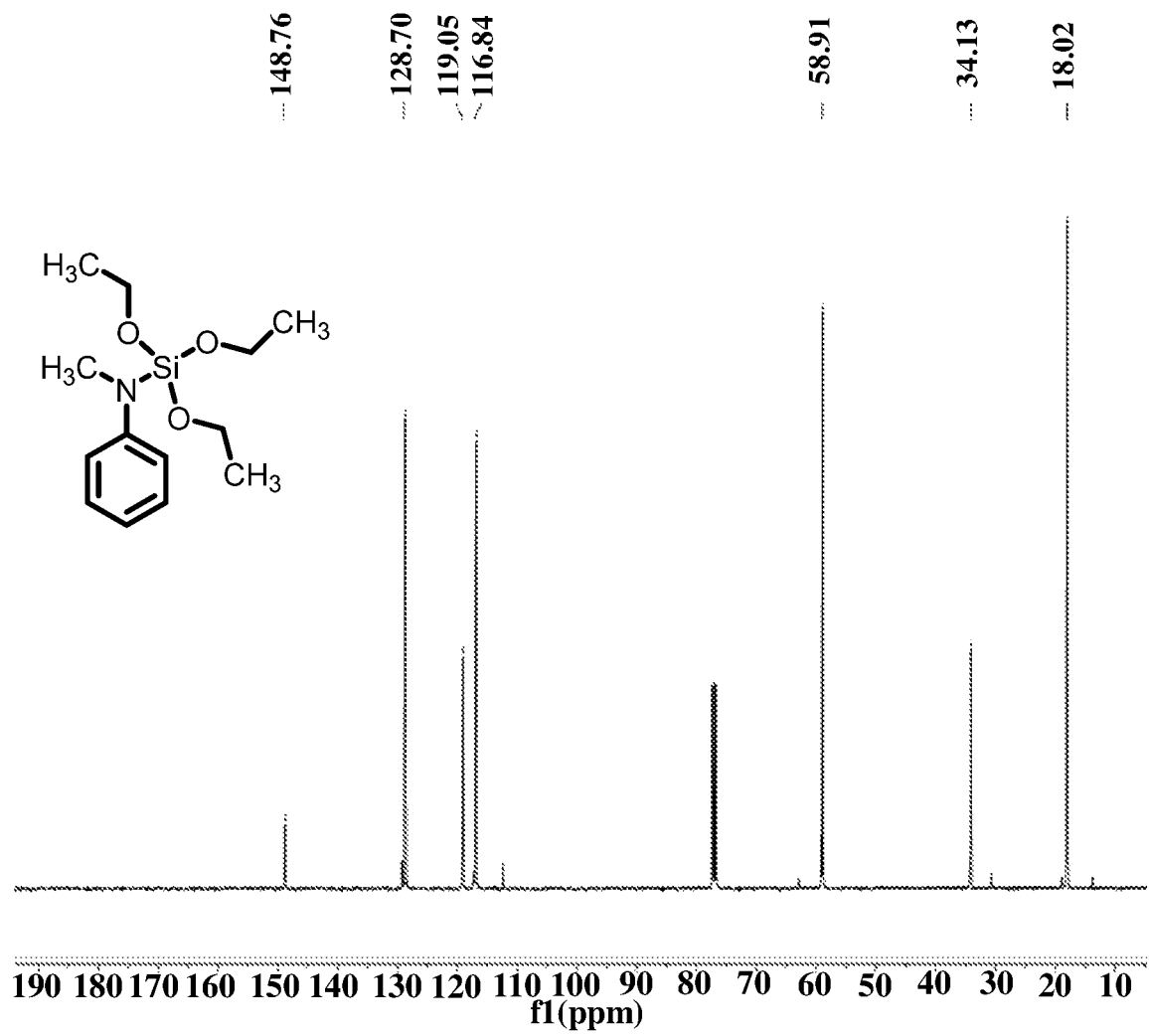
FIG. 6 is a $^{13}C$ NMR spectrum of (N-methylanilino)triethoxysilane in Example 3 of the present disclosure.

$^{13}$C NMR (400 MHz, CDCl$_3$, 25° C., TMS): δ(ppm) 148.76, 128.70, 119.05, 116.84, 58.91, 34.13, 18.02. NMR spectra are shown in FIGS. 5 and 6.

(2) Preparation of Titanium-Containing Solid Catalyst: the Same as in Example 1.

(3) Propylene Polymerization Experiment

A stainless steel reactor with a volume of 2 L was fully substituted with gas propylene, and then 5 mL of a triethylaluminum solution with a concentration of 2.4 mol/L, 0.9 mmol of the synthesized external electron donor compound N-(methylanilino)triethoxysilane, and 30 mg of the titanium-containing solid catalyst component prepared above were sequentially added, and 500 g of liquid propylene was introduced. The temperature was raised to 70° C., and the reaction was maintained at this temperature for 0.5 hour, and the temperature was lowered and the pressure was released to obtain a polypropylene product. The results of the catalyst polymerization experiment are shown in Table 1.

EXAMPLE 4

(1) Synthesis of (N-methylanilino)methyldiethoxysilane:

5.7 g of N-methylaniline and 40 mL of THF were added to a 100 mL Schlenk flask. The temperature was dropped to 0° C., and 33.5 mL of n-butyl lithium (2.5 M solution in n-hexane) was slowly added dropwise. After 2 hours of reaction, 14 g of methyldiethoxychlorosilane was added dropwise, and the reaction mixture was naturally warmed to room temperature and reacted overnight. The solvent was removed by vacuo, and 100 mL of n-hexane was added for filtration. Then n-hexane was removed by vacuo, and the residue was subjected to distillation under reduced pressure to give 7.4 g of yellow liquid with a yield of 58%.

$^1$H NMR (400 MHz, CDCl$_3$, 25° C., TMS): δ(ppm) 7.26 (t, 2H, $^3J_{H-H}$=8.0 Hz, Ar—H), 7.09 (d, 2H, $^3J_{H-H}$=8.0 Hz, Ar—H), 6.86 (t, 1H, $^3J_{H-H}$=8.0 Hz, Ar—H), 3.84 (m, 4H, N(OCH$_2$CH$_3$)), 3.02 (s, 3H, NCH$_3$), 1.26 (t, 6H, $^3J_{H-H}$=8.0 Hz, N(OCH$_2$CH$_3$)), 0.32 (s, 3H, SiCH$_3$).

Figure 7:
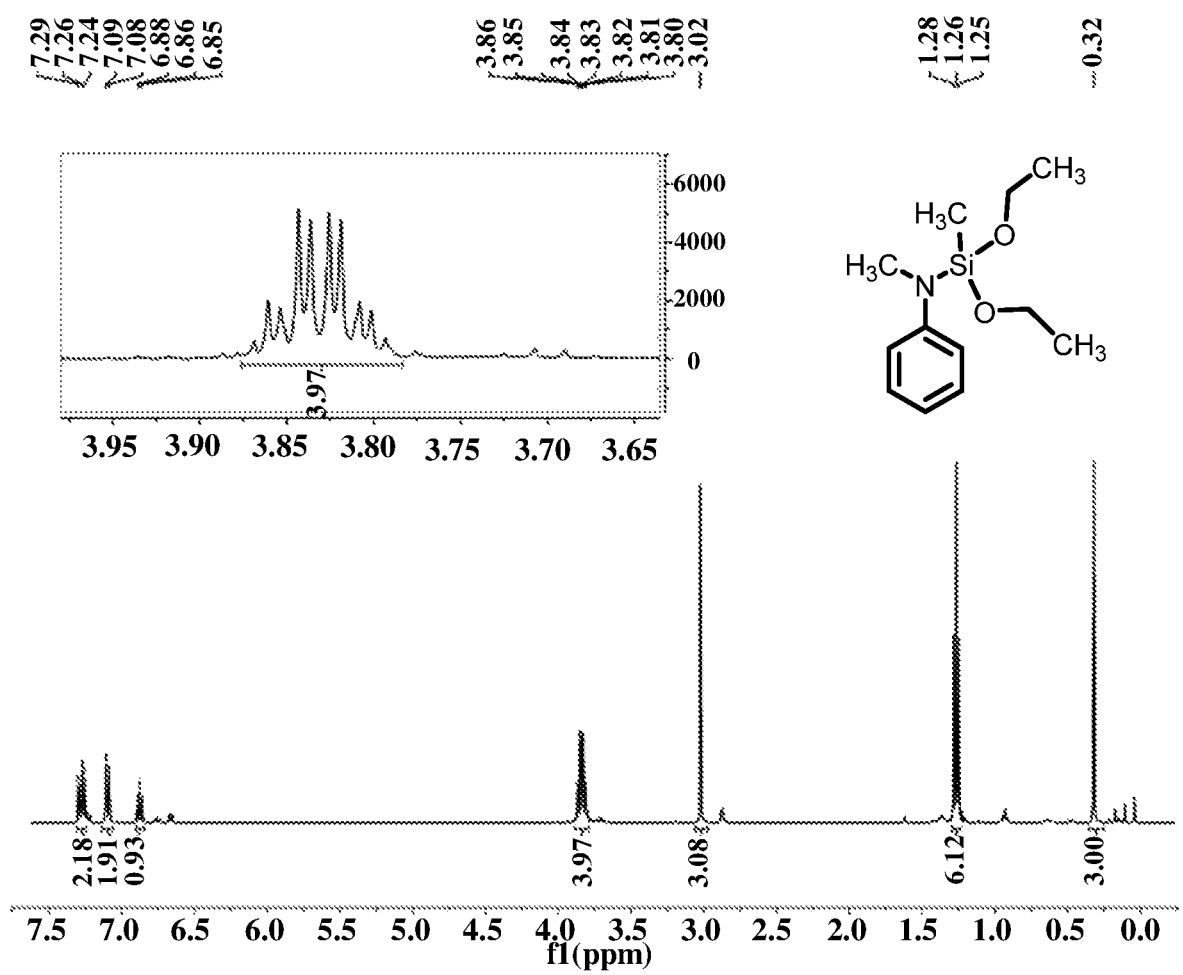
FIG. 7 is a $^1H$ NMR spectrum of (N-methylanilino)methyldiethoxysilane in Example 4 of the present disclosure.
Figure 8:
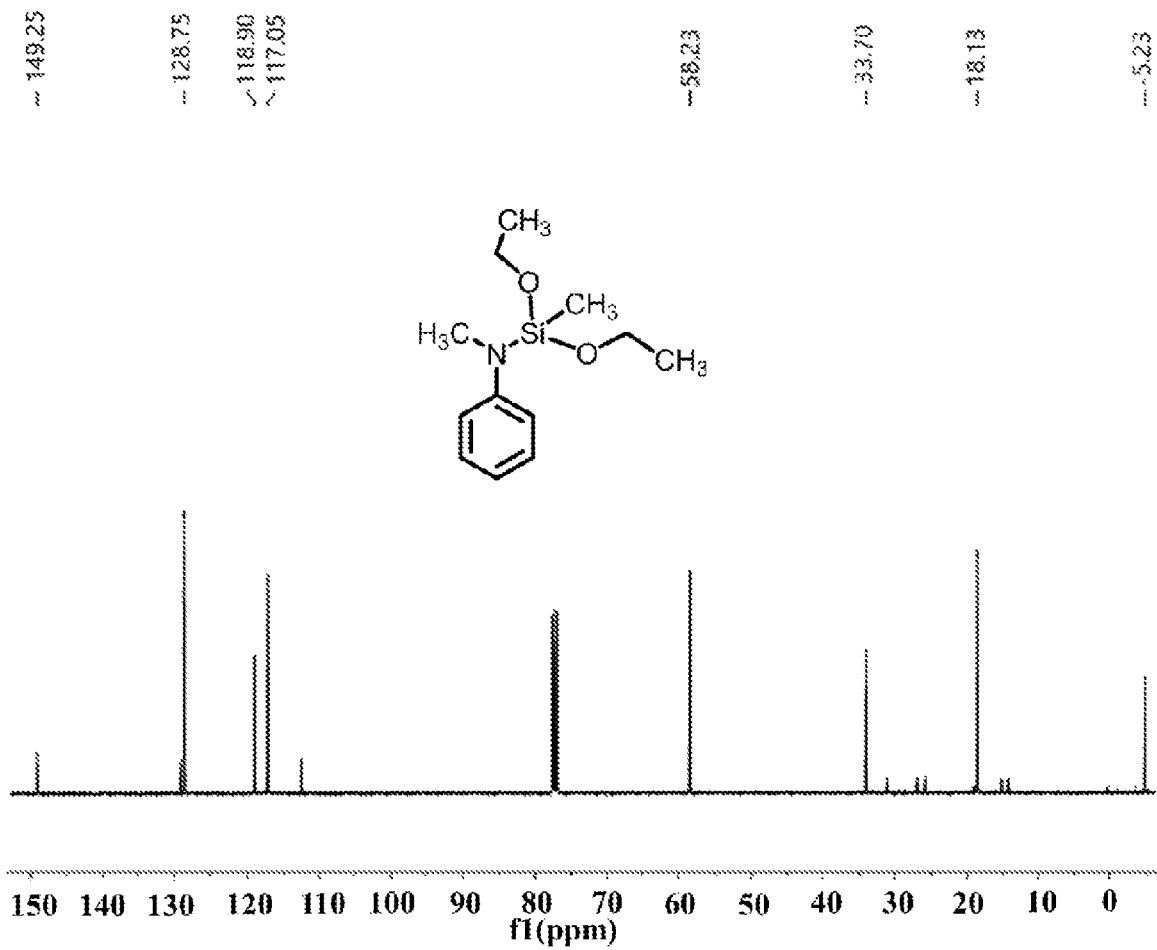
FIG. 8 is a $^{13}C$ NMR spectrum of (N-methylanilino)methyldiethoxysilane in Example 4 of the present disclosure.

$^{13}$C NMR (400 MHz, CDCl$_3$, 25° C., TMS): δ(ppm) 149.25, 128.75, 118.90, 117.05, 58.23, 33.70, 18.13, −5.23. NMR spectra are shown in FIGS. 7 and 8.

(2) Preparation of Titanium-Containing Solid Catalyst: the Same as in Example 1.

(3) Propylene Polymerization Experiment

A stainless steel reactor with a volume of 2 L was fully substituted with gas propylene, and then 5 mL of a triethylaluminum solution with a concentration of 2.4 mol/L, 0.9 mmol of the synthesized external electron donor compound N-(methylanilino)methyldiethoxysilane, and 30 mg of the titanium-containing solid catalyst component prepared above were sequentially added, and 500 g of liquid propylene was introduced. The temperature was raised to 70° C., and the reaction was maintained at this temperature for 0.5 hour. The temperature was lowered and the pressure was released to obtain a polypropylene product. The results of the catalyst polymerization experiment are shown in Table 1.

EXAMPLE 5

(1) Synthesis of (2,6-diisopropyl-N-trimethylsilylanilino) trimethoxysilane 75 g of 2,6-diisopropylaniline and 300 mL of THF were added to a 1000 mL Schlenk flask substituted with nitrogen. The temperature was dropped to 0° C., and 350 mL of n-butyl lithium (1.6 M solution in n-hexane) was slowly added dropwise. When no bubble was generated, 50 g of trimethylchlorosilane was added dropwise in 1 hour. After the dropwise addition, the reaction was performed at room temperature for 2 hours. Then it was filtered, and the solvent was removed under vacuum, and the remaining oily liquid was distilled under reduced pressure to give 86.7 g of 2,6-diisopropyl-N-trimethylsilylaniline as light yellow oily substance with a yield of 85%.

40 g of 2,6-diisopropyl-N-trimethylsilylaniline synthesized above and 150 mL of THF were added to a 500 mL Schlenk flask, and 130 mL of n-BuLi (1.6 M solution in n-hexane) was slowly added dropwise at 0° C. When the dropwise addition was completed and no bubble was generated, the reaction was continued for 2 hours, and then 35 g of silicon tetrachloride was added dropwise. The mixture was naturally warmed to room temperature and stirred overnight. The solvent was removed by vacuo, and 150 mL of n-hexane was added, followed by filtration, concentration under vacuo and freeze crystallization, to give 48.6 g (2,6-diisopropyl-N-trimethylsilylanilino)trichlorosilane as a white solid with a yield of 79%.

10 g of (2,6-diisopropyl-N-trimethylsilylanilino)trichlorosilane synthesized above and 200 mL of toluene were added to a 500 mL Schlenk flask, and then 15 g of anhydrous methanol and 30 g of triethylamine in toluene were added dropwise, and the reaction was carried out for 12 h. The solvent was removed under vacuum, and n-hexane was added for filtration. It was concentrated under vacuum until a solid was just generated, and then placed in a refrigerator for crystallization, to give 7.0 g of (2,6-diisopropyl-N-trimethylsilylanilino)trimethoxysilane as a white solid, with a yield of 73%, melting point: 132-135° C. $^1$H NMR (400 MHz, CDCl$_3$, 25° C., TMS): δ(ppm) 7.10 (d, 1H, $^3J_{H-H}$=5.2 Hz, Ar—H), 7.07 (t, 2H, $^3J_{H-H}$=6.0 Hz, Ar—H), 3.57 (m, 2H, $^3J_{H-H}$7.2 Hz, CH(CH$_3$)$_2$), 3.46 (s, 9H, OCH$_3$), 1.22 (q, 12H, $^3J_{H-H}$=4.8 Hz, CH(CH$_3$)$_2$), 0.11 (s, 9H, Si(CH$_3$)$_3$).

Figure 9:
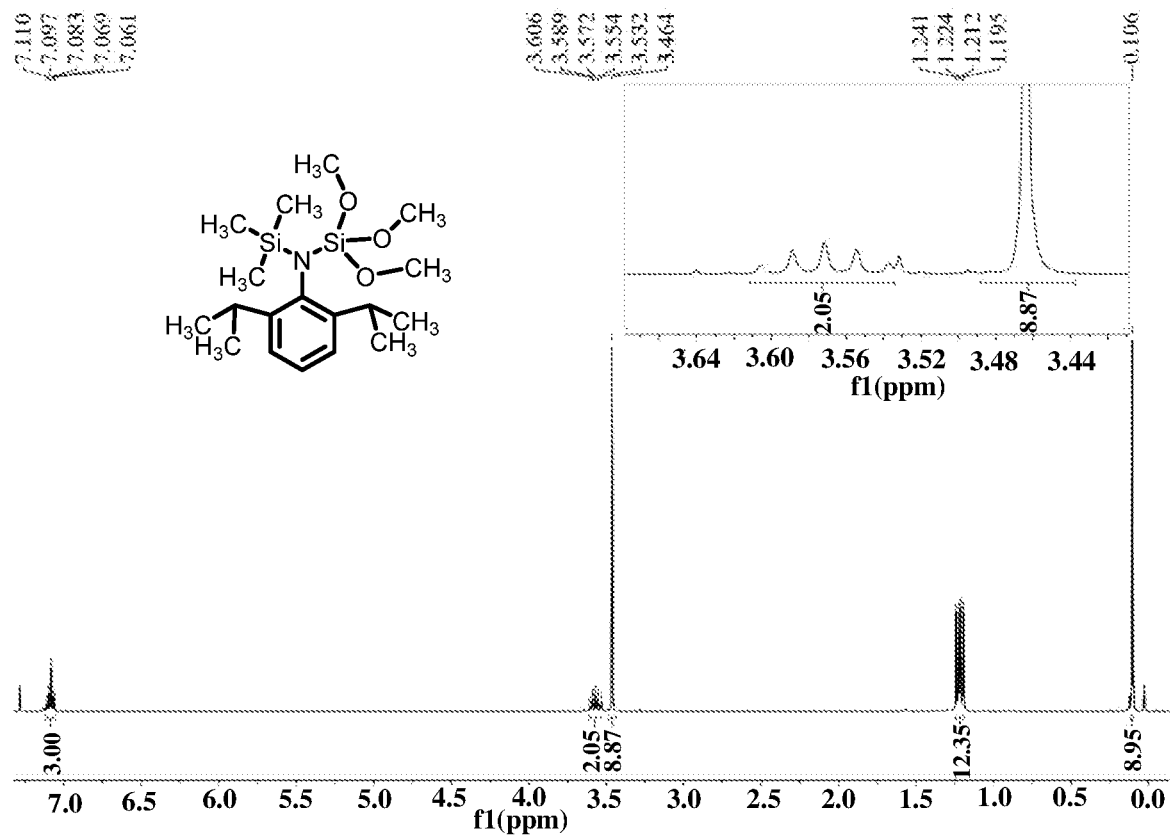
FIG. 9 is a $^1H$ NMR spectrum of (2,6-diisopropyl-N-trimethylsilylanilino)trimethoxysilane in Example 5 of the present disclosure.
Figure 10:
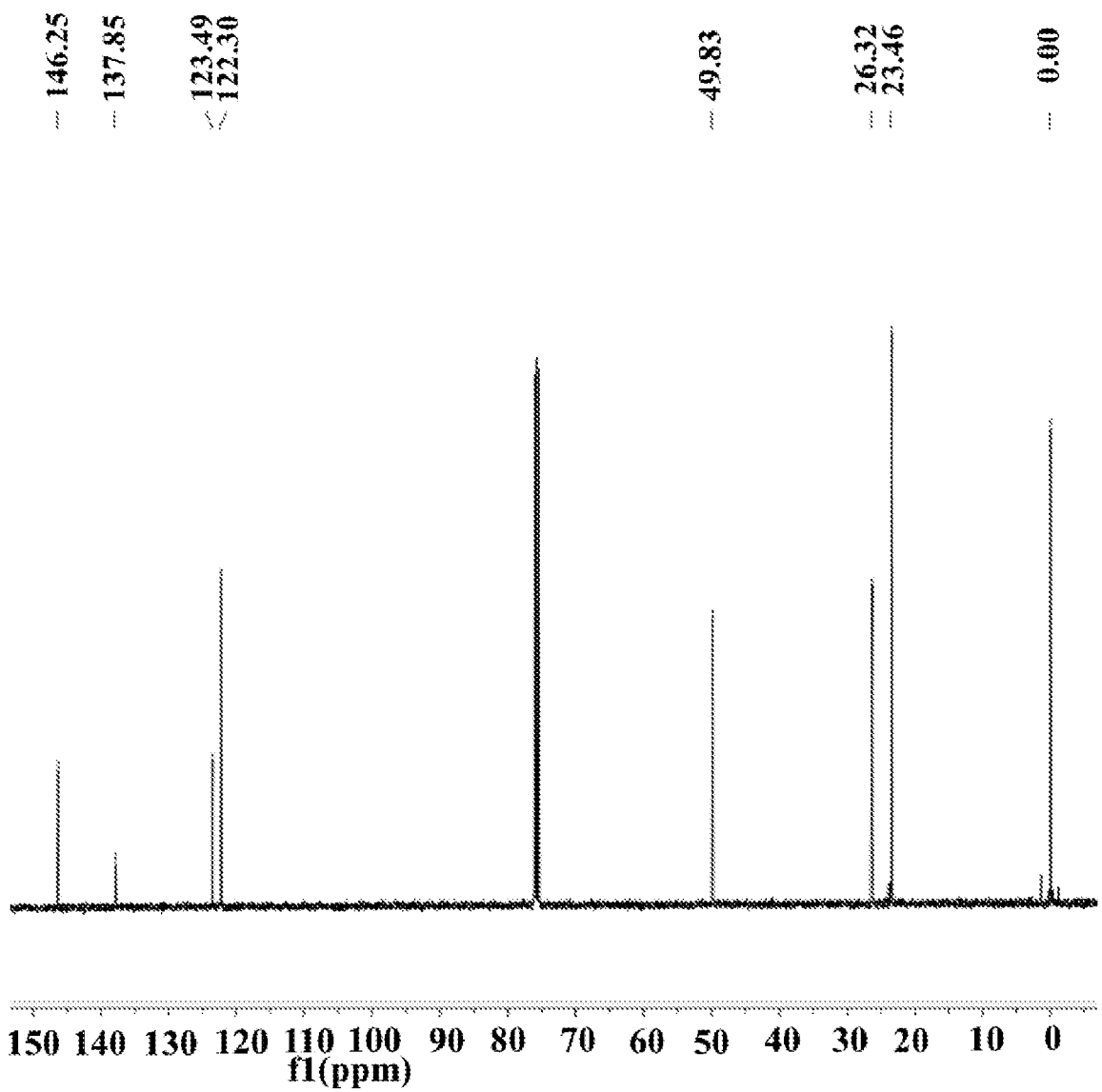
FIG. 10 is a $^{13}C$ NMR spectrum of (2,6-diisopropyl-N-trimethylsilylanilino)trimethoxysilane in Example 5 of the present disclosure.

$^{13}$C NMR (400 MHz, CDCl$_3$, 25° C., TMS): δ(ppm) 137.35, 123.49, 122.30, 49.83, 26.32, 23.46, 0.01. NMR spectra are shown in FIGS. 9 and 10.

(2) Preparation of Titanium-Containing Solid Catalyst: the Same as in Example 1.

(3) Propylene Polymerization Experiment

A stainless steel reactor with a volume of 2 L was fully substituted with gas propylene, and then 5 mL of a triethylaluminum solution with a concentration of 2.4 mol/L, 0.9 mmol of the synthesized external electron donor compound 2,6-diisopropylanilino(N-trimethylsilyl)trimethoxysilane, and 30 mg of the titanium-containing solid catalyst component prepared above were sequentially added, and 500 g of liquid propylene was introduced. The temperature was raised to 70° C., and the reaction was maintained at this temperature for 0.5 hour. The temperature was lowered and the pressure was released to obtain a polypropylene product. The results of the catalyst polymerization experiment are shown in Table 1.

EXAMPLE 6

(1) Synthesis of (2,6-diisopropyl-N-trimethylsilylanilino) methyldimethoxysilane 38 g of the intermediate 2,6-diisopropyl-N-trimethylsilylaniline synthesized in Example 5 and 150 mL of THF were added to a 500 mL Schlenk flask, and 150 mL of n-BuLi (1.6 M solution in n-hexane) was slowly added dropwise at 0° C. When the dropwise addition was completed and no bubble was generated, the reaction was continued for 2 hours. The temperature was lowered to −78° C. and 26 g of methyltrichlorosilane was added dropwise. The reaction mixture was naturally warmed to room temperature and stirred overnight. It was concentrated under vacuum until a solid was just generated, and placed in a refrigerator for crystallization, to give 40 g of (2,6-diisopropyl-N-trimethylsilylanilino)methyldichlorosilane as a white solid with a yield of 70%.

$^1$H NMR (400 MHz, CDCl$_3$, 25° C., TMS): δ(ppm) 7.188 (t, 1H, $^3J_{H-H}$=6.0 Hz, Ar—H), 7.188 (d, 2H, $^3J_{H-H}$=6.8 Hz, Ar—H), 3.465 (m, 2H, $^3J_{H-H}$=6.8 Hz, CH(CH$_3$)$_2$), 1.24 (m, 12H, $^3J_{H-H}$=6.8 Hz, CH(CH$_3$)$_2$), 0.550 (s, 3H, SiCl$_2$CH$_3$), 0.242 (s, 9H, Si(CH$_3$)$_3$).

$^{13}$C NMR (400 MHz, CDCl$_3$, 25° C., TMS): δ(ppm) 145.238, 137.336, 124.077, 122.353, 25.969, 23.291, 22.937, 4.653.

10.8 g of (2,6-diisopropyl-N-trimethylsilylanilino)methyldichlorosilane and 200 mL of toluene were added to a 500 mL Schlenk flask, and then 35 g of anhydrous methanol and 13.8 g of triethylamine in toluene were added dropwise, and the reaction was carried out for 24 h. The solvent was removed under vacuum, and 150 mL of n-hexane was added for filtration. It was concentrated under vacuum until a solid was just generated, and placed in a refrigerator for crystallization, to give 7 g of a white solid, with a yield of 65%, melting point of 96-98° C.

$^1$H NMR (400 MHz, CDCl$_3$, 25° C., TMS): δ(ppm) 7.188 (t, 1H, $^3J_{H-H}$=6.0 Hz, Ar—H), 7.188 (d, 2H, $^3J_{H-H}$=6.8 Hz, Ar—H), 3.465 (m, 2H, $^3J_{H-H}$=6.8 Hz, CH(CH$_3$)$_2$), 1.24 (m, 12H, $^3J_{H-H}$=6.8 Hz, CH(CH$_3$)$_2$), 0.550 (s, 3H, SiCl$_2$CH$_3$ ), 0.242 (s, 9H, Si(CH$_3$)$_3$).

Figure 11:
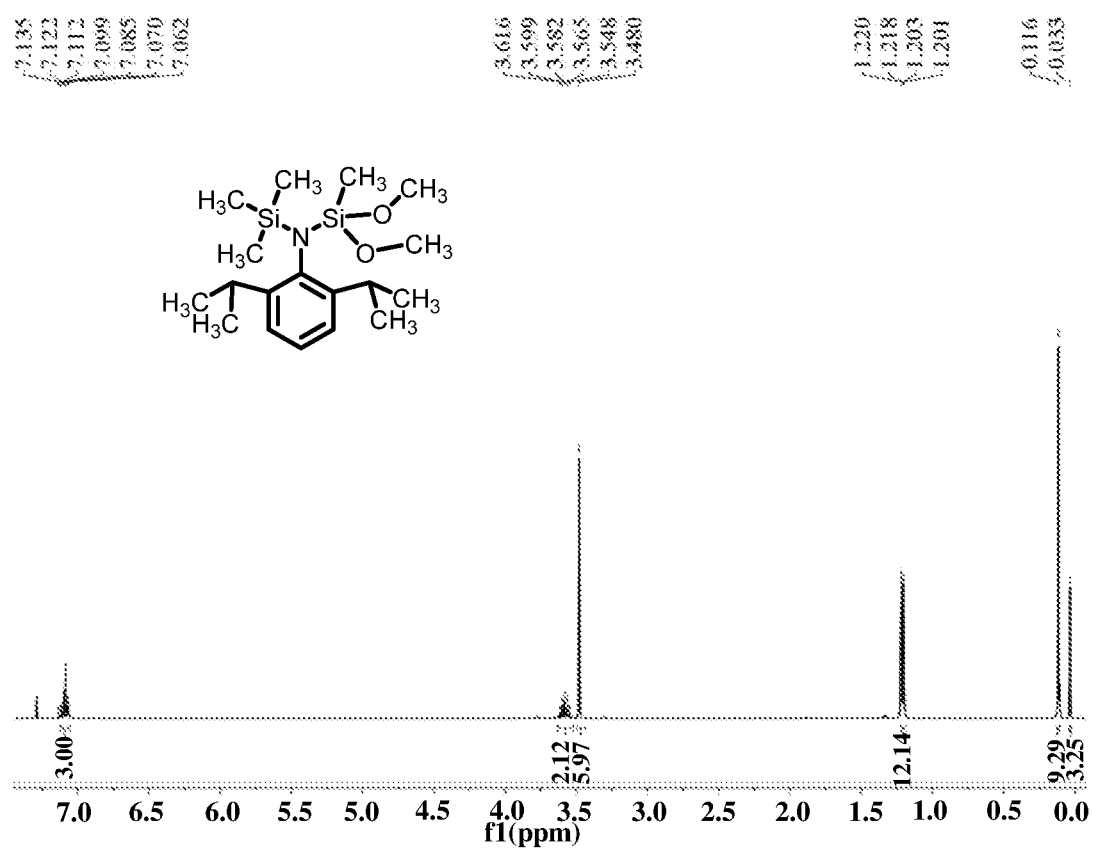
FIG. 11 is a $^1H$ NMR spectrum of (2,6-diisopropyl-N-trimethylsilylanilino)methyldimethoxysilane in Example 6 of the present disclosure.
Figure 12:
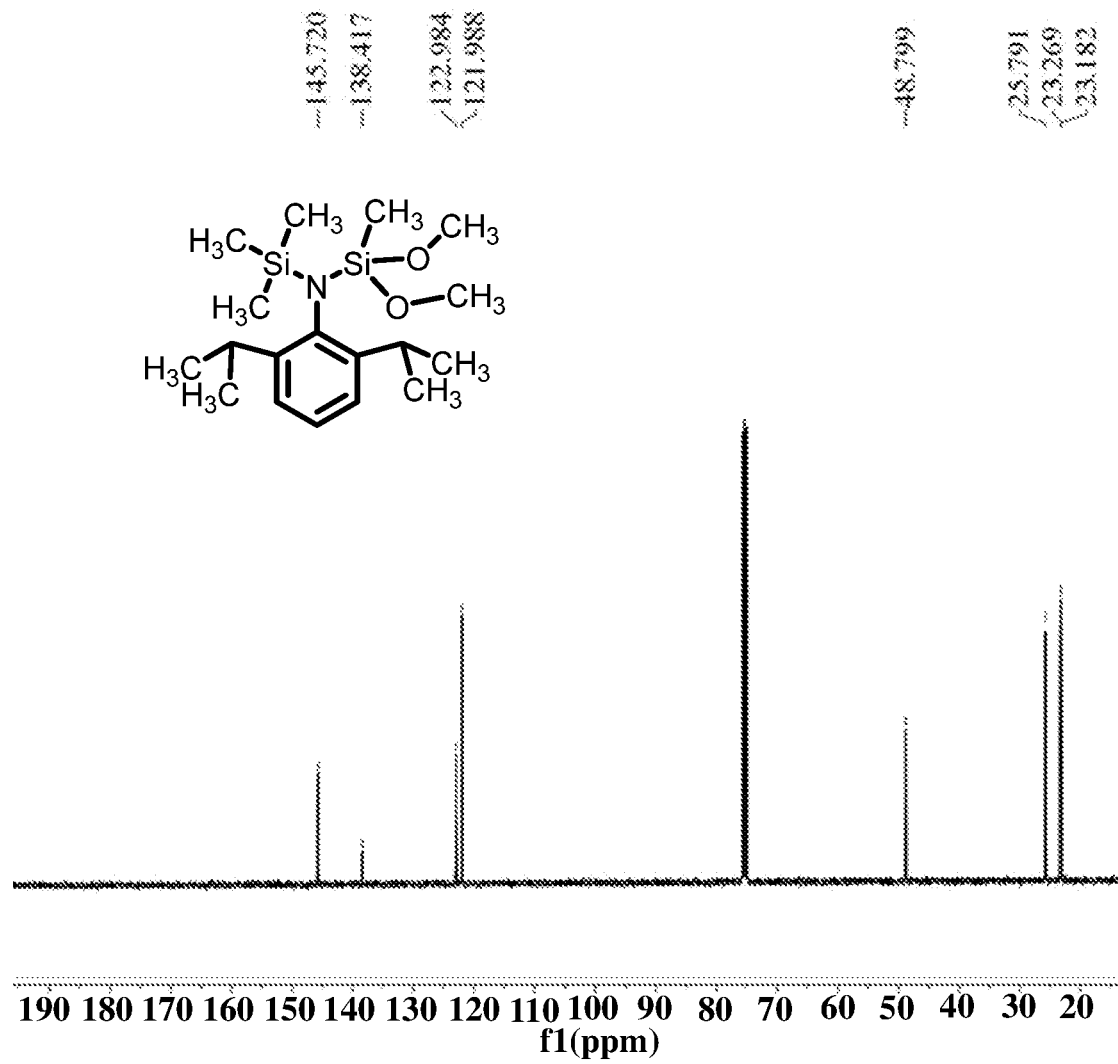
FIG. 12 is a $^{13}C$ NMR spectrum of (2,6-diisopropyl-N-trimethylsilylanilino)methyldimethoxysilane in Example 6 of the present disclosure.

$^{13}$C NMR (400 MHz, CDCl$_3$, 25° C., TMS): δ(ppm) 145.238, 137.336, 124.077, 122.353, 25.969, 23.291, 22.937, 4.653. NMR spectra are shown in FIGS. 11 and 12.

(2) Preparation of Titanium-Containing Solid Catalyst: the Same as in Example 1.

(3) Propylene Polymerization Experiment

A stainless steel reactor with a volume of 2 L was fully substituted with gas propylene, and then 5 mL of a triethylaluminum solution with a concentration of 2.4 mol/L, 0.9 mmol of the synthesized external electron donor compound 2,6-diisopropylanilino(N-trimethylsilyl)methyldimethoxysilane, and 30 mg of the titanium-containing solid catalyst component prepared above were sequentially added, and 500 g of liquid propylene was introduced. The temperature was raised to 70° C., and the reaction was maintained at this temperature for 0.5 hour. The temperature was lowered and the pressure was released to obtain a polypropylene product. The results of the catalyst polymerization experiment are shown in Table 1.

EXAMPLE 7

(1) Synthesis of (2,6-diisopropyl-N-trimethylsilylanilino) triethoxysilane:

12.5 g of the intermediate 2,6-diisopropyl-N-trimethylsilylaniline synthesized in Example 5 and 100 mL of THF were added to a 200 mL Schlenk flask. The temperature was dropped to 0° C., and 50 mL of n-butyl lithium (1.6 M solution in n-hexane) was slowly added dropwise. The reaction mixture was naturally warmed to room temperature and reacted for 2 hours and then 8.7 g of triethoxychlorosilane was added dropwise, and the reaction was carried out for 24 hours. The solvent was removed by vacuo, 100 mL of n-hexane was added for filtration, and the solvent in the filtrate was removed by vacuo. Then it was separated by column chromatography to give 9.5 g of an orange solid with a yield of 57% and a melting point of 150-152° C.

$^1$H NMR (400 MHz, CDCl$_3$, 25° C., TMS): δ(ppm) 6.97 (t, 1H, $^3J_{H-H}$=5.2 Hz, Ar—H), 6.94 (t, 2H, $^3J_{H-H}$=5.6 Hz, Ar—H), 3.63 (q, 2H, $^3J_{H-H}$=7.2 Hz, OCH$_2$CH$_3$), 3.58 (t, 4H, $^3J_{H-H}$=7.2 Hz, OCH$_2$CH$_3$), 3.49 (m, 2H, $^3J_{H-H}$=7.2 Hz, CH(CH$_3$)$_2$), 1.10 (q, 12H, $^3J_{H-H}$=6.8 Hz, CH(CH$_3$)$_2$), 1.02 (t, 6H, $^3J_{H-H}$=6.8 Hz, OCH$_2$CH$_3$), 1.01 (t, 3H, $^3J_{H-H}$=6.8 Hz, OCH$_2$CH$_3$), 0.00 (s, 9H, Si(CH$_3$)$_3$).

Figure 13:
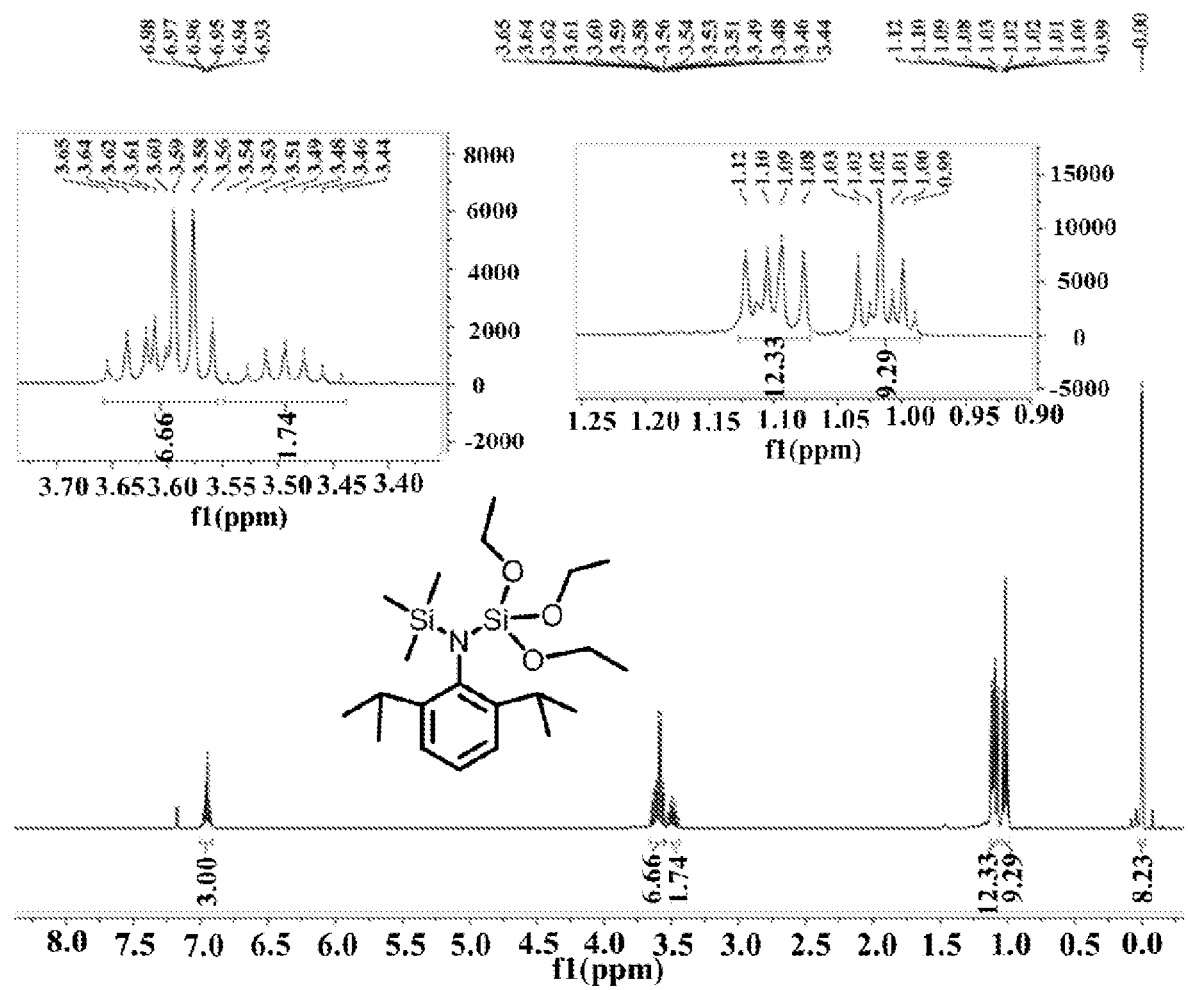
FIG. 13 is a $^1H$ NMR spectrum of (2,6-diisopropyl-N-trimethylsilylanilino)triethoxysilane in Example 7 of the present disclosure.
Figure 14:
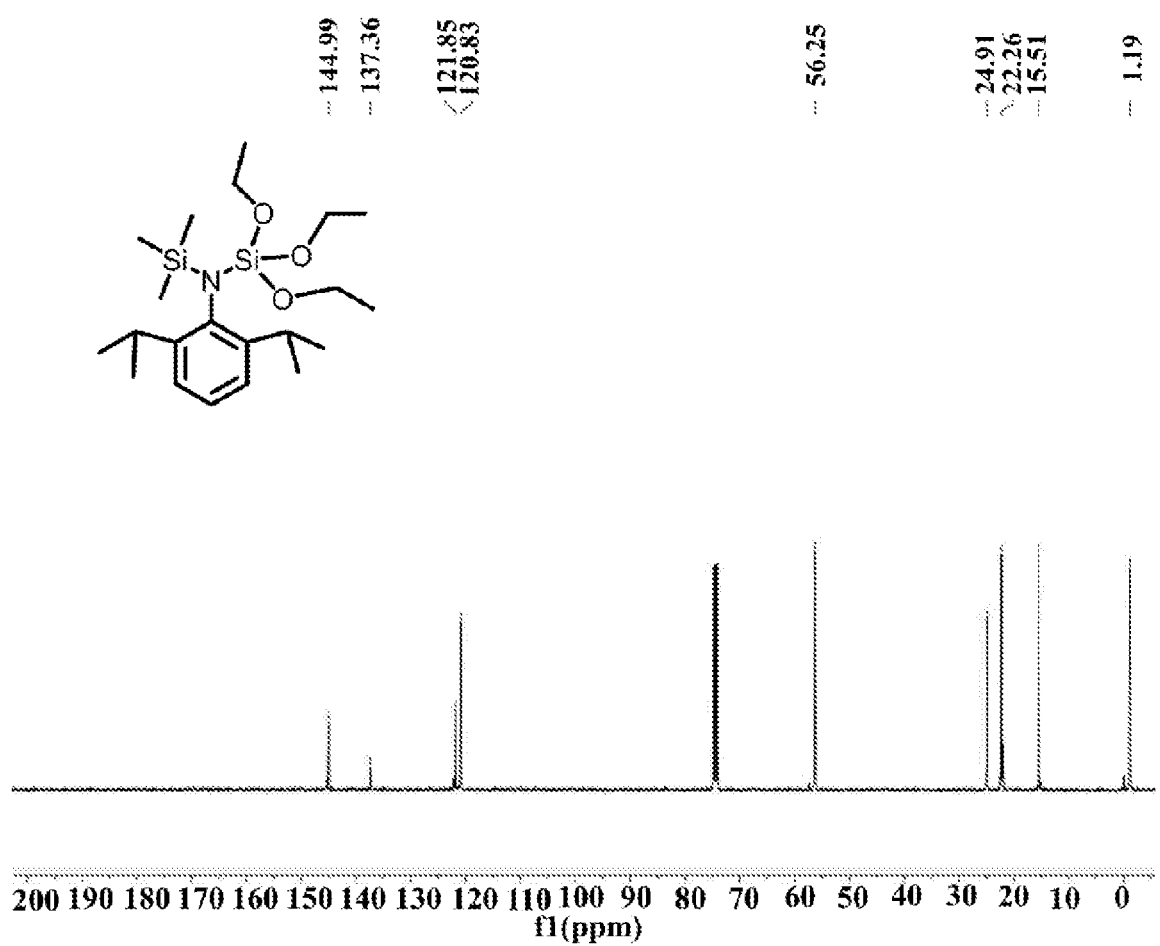
FIG. 14 is a $^{13}C$ NMR spectrum of (2,6-diisopropyl-N-trimethylsilylanilino)triethoxysilane in Example 7 of the present disclosure.

$^{13}$C NMR (400 MHz, CDCl$_3$, 25° C., TMS): δ(ppm) 144.99, 137.36, 121.85, 120.83, 56.25, 24.91, 22.26, 15.51, −1.19. NMR spectra are shown in FIGS. 13 and 14.

(2) Preparation of Titanium-Containing Solid Catalyst: the Same as in Example 1.

(3) Propylene Polymerization Experiment

A stainless steel reactor with a volume of 2 L was fully substituted with gas propylene, and then 5 mL of a triethylaluminum solution with a concentration of 2.4 mol/L, 0.9 mmol of the synthesized external electron donor compound 2,6-diisopropylanilino(N-trimethylsilyl)triethoxysilane, and 30 mg of the titanium-containing solid catalyst component prepared above were sequentially added, and 500 g of liquid propylene was introduced. The temperature was raised to 70° C., and the reaction was maintained at this temperature for 0.5 hour. The temperature was lowered and the pressure was released to obtain a polypropylene product. The results of the catalyst polymerization experiment are shown in Table 1.

EXAMPLE 8

(1) Synthesis of (2,6-diisopropyl-N-trimethylsilylanilino) methyldiethoxysilane:

10.8 g of the compound 2,6-diisopropyl(N-trimethylsilyl) anilinomethyldichlorosilane synthesized in Example 6 and 15.5 g of anhydrous ethanol were added to a 200 mL Schlenk flask, and then 15 g of triethylamine was added dropwise and reacted for 7 hours. The solvent was removed under vacuum, 150 mL of n-hexane was added for filtration, and the solvent was removed under vacuum to give 7 g of an orange liquid with a yield of 41%.

$^1$H NMR (400 MHz, CDCl$_3$, 25° C., TMS): δ(ppm) 7.09 (d, 2H, $^3J_{H-H}$=5.2 Hz, Ar—H), 7.07 (t, 1H, $^3J_{H-H}$=5.2 Hz, Ar—H), 3.74 (q, 4H, $^3J_{H-H}$=6.8 Hz, Si(OCH$_2$CH$_3$)), 3.62 (m, 2H, $^3J_{H-H}$=6.8 Hz, CH(CH$_3$)$_2$), 1.21 (d, 12H, $^3J_{H-H}$=6.8 Hz, CH(CH$_3$)$_2$), 1.19 (t, 6H, $^3J_{H-H}$=6.8 Hz, Si(OCH$_2$CH$_3$)), 0.13 (s, 9H, Si(CH$_3$)$_3$), 0.01 (s, 3H, SiCH$_3$).

Figure 15:
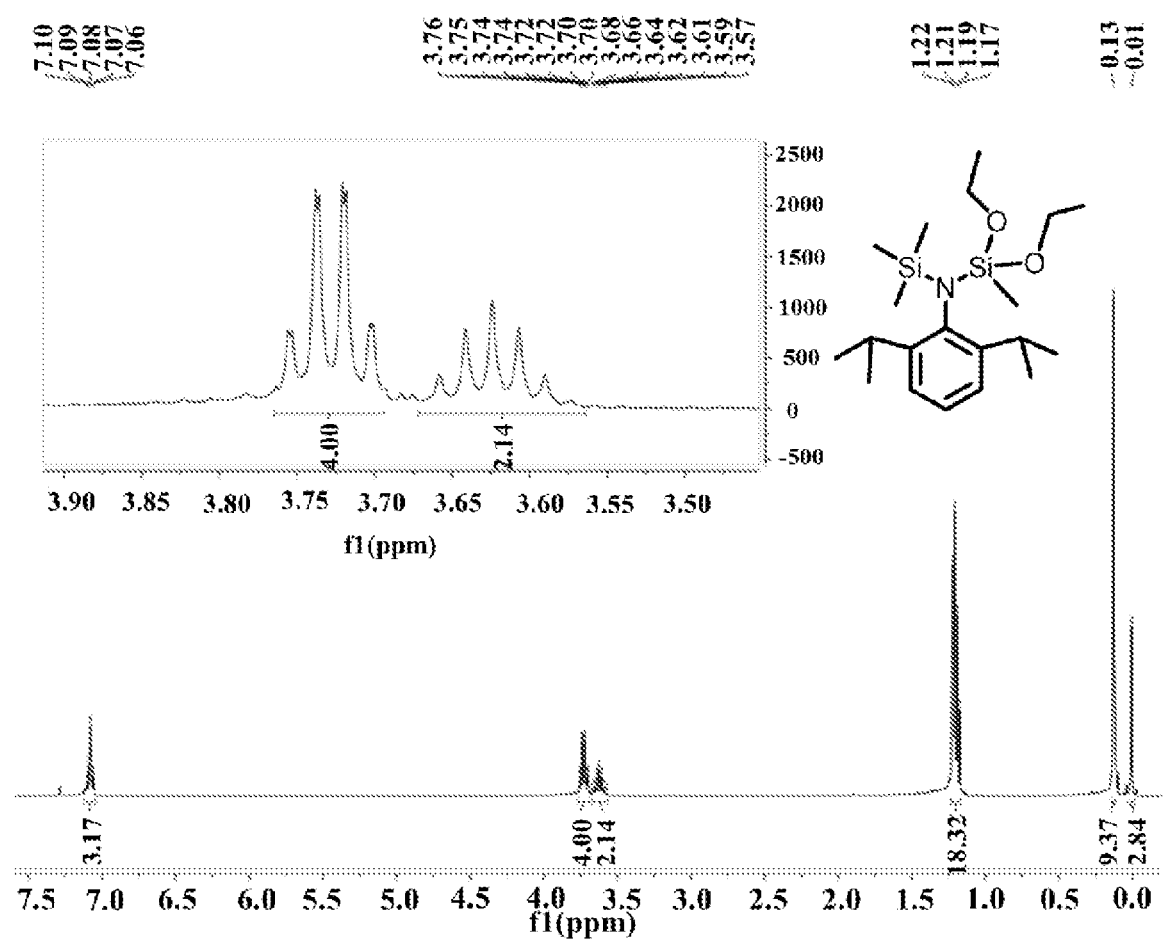
FIG. 15 is a $^1H$ NMR spectrum of (2,6-diisopropyl-N-trimethylsilylanilino)methyldiethoxysilane in Example 8 of the present disclosure.
Figure 16:
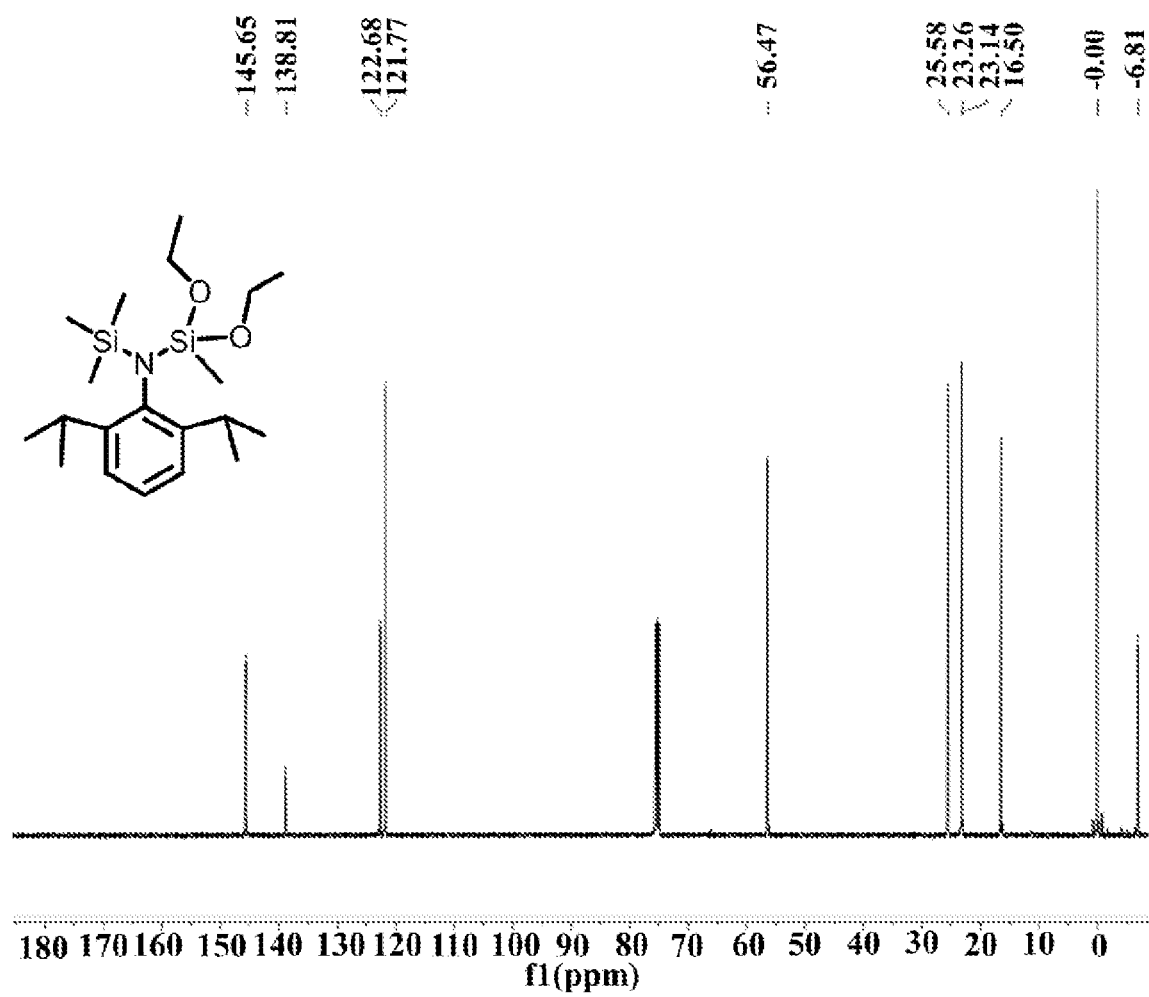
FIG. 16 is a $^{13}C$ NMR spectrum of (2,6-diisopropyl-N-trimethylsilylanilino)methyldiethoxysilane in Example 8 of the present disclosure.

$^{13}$C NMR (400 MHz, CDCl$_3$, 25° C., TMS): δ(ppm) 145.65, 138.81, 122.68, 121.77, 56.47, 25.58, 23.26, 23.14, 16.50, −6.81. NMR spectra are shown in FIGS. 15 and 16.

(2) Preparation of Titanium-Containing Solid Catalyst: the Same as in Example 1.

(3) Propylene Polymerization Experiment

A stainless steel reactor with a volume of 2 L was fully substituted with gas propylene, and then 5 mL of a triethylaluminum solution with a concentration of 2.4 mol/L, 0.9 mmol of the synthesized external electron donor compound 2,6-diisopropylanilino(N-trimethylsilyl)methyldiethoxysilane, and 30 mg of the titanium-containing solid catalyst component prepared above were sequentially added, and 500 g of liquid propylene was introduced. The temperature was raised to 70° C., and the reaction was maintained at this temperature for 0.5 hour. The temperature was lowered and the pressure was released to obtain a polypropylene product. The results of the catalyst polymerization experiment are shown in Table 1.

COMPARATIVE EXAMPLE 1

The same titanium-containing solid catalyst component and propylene polymerization method were used as in Examples 1-8, except that the external electron donor compound was changed to cyclohexylmethyldimethoxysilane.

From the results of the catalyst polymerization experiments in Table 1, it can be seen that the isotacticity of the polymerization product obtained by using the arylaminosiloxane compound of the present disclosure as an external electron donor is substantially the same as that of the known typical organosiloxane external electron donor used in Comparative Example 1. However, when the arylaminosiloxane compound of the present disclosure is used as the external electron donor, the melt index of the polypropylene obtained by polymerization reaction of propylene is significantly higher than the melt index of the polypropylene obtained by polymerization reaction of propylene when the known typical organosiloxane external electron donor in Comparative Example 1 was used as the external electron donor.

Therefore, it is demonstrated that the propylene polymerization catalysts with the arylaminosiloxane compound as the external electron donor have good hydrogen response; moreover, the isotacticity of polypropylene is also relatively high, so it can be used to prepare polypropylene materials with high flowability and high isotacticity.

TABLE 1

Results of catalyst polymerization experiments

| Example | External electron donor | Catalytic activity (KgPP/gCat/h) | Isotacticity (%) | Melt Index (g/10 min, 2.16 Kg) |
| --- | --- | --- | --- | --- |
| Comparative Example 1 | cyclohexylmethyldimethoxysilane | 32.0 | 95.8 | 20.8 |
| Example 1 | (N-methylanilino) trimethoxysilane | 37.8 | 95.0 | 35.1 |

TABLE 1-continued

Results of catalyst polymerization experiments

| Example | External electron donor | Catalytic activity (KgPP/ gCat/h) | Iso-tacticity (%) | Melt Index (g/10 min, 2.16 Kg) |
|---|---|---|---|---|
| Example 2 | (N-methylanilino) methyldimethoxysilane | 31.7 | 95.2 | 125.3 |
| Example 3 | (N-methylanilino) triethoxysilane | 31.5 | 94.1 | 63.8 |
| Example 4 | (N-methylanilino) methyldiethoxysilane | 41.4 | 95.6 | 50.0 |
| Example 5 | (2,6-diisopropyl-N-trimethylsilylanilino) trimethoxysilane | 30.0 | 94.8 | 31.4 |
| Example 6 | (2,6-diisopropyl-N-trimethylsilylanilino) methyldimethoxysilane | 33.5 | 95.3 | 103.3 |
| Example 7 | (2,6-diisopropyl-N-trimethylsilylanilino) triethoxysilane | 39.0 | 94.8 | 34.2 |
| Example 8 | (2,6-diisopropyl-N-trimethylsilylanilino) methyldiethoxysilane | 35.0 | 92.6 | 62.2 |

It is apparent that the above Examples of the present disclosure are merely examples for clearly explaining the present disclosure, and are not intended to limit the embodiments of the present disclosure. For a person of ordinary skill in the art, other different forms of changes or modifications can be made on the basis of the above description. Not all embodiments can be exhausted herein. Every obvious change or modification that is derived from the technical solution of the present disclosure is still within the protection scope of the present disclosure.

What is claimed is:

1. An arylaminosilane compound, wherein the arylaminosilane compound is (N-methylanilino)methyldiethoxysilane.

2. A method for preparing an arylaminosilane compound according to claim 1, wherein a first method of the preparing method includes the following steps:

reacting an arylamine represented by Formula II with an alkyl lithium in an organic solvent under a protective gas atmosphere at −80° C. to 30° C.; adding $R_7R_8R_9SiCl$ to the reaction system without separation and reacting at −80° C. to 30° C., so as to obtain the arylaminosilane compound after the completion of the reaction;

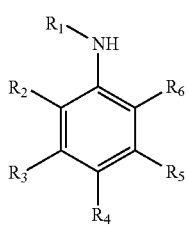

Formula II or, a second method includes the following steps:

reacting an arylamine represented by Formula II with an alkyl lithium in an organic solvent under a protective gas atmosphere at −80° C. to 30° C.; adding $(R_7)_mSiCl_{4-m}$ to the reaction system without separation to continue the reaction, to obtain an intermediate represented by Formula III after the completion of the reaction; wherein $R_7$ is methyl and m is 0 or 1;

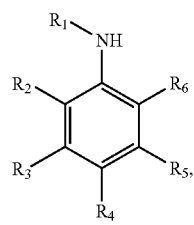

Formula II

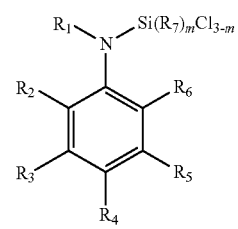

Formula III dissolving the intermediate represented by formula III in an organic solvent, adding ROH thereto, and reacting at 0° C. to 60° C. to obtain a compound of formula IV;

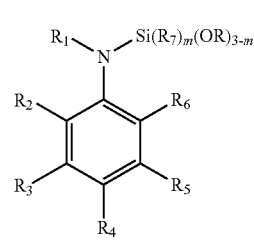

Formula IV wherein R is a $C_1$-$C_8$ alkyl group;
wherein the arylamine is N-methylaniline; $R_7R_8R_9SiCl$ is $CH_3(C_2H_5O)_2SiCl$.

3. The method according to claim 2, wherein in the first method or the second method, the molar ratio of the arylamine to the alkyl lithium is 1: (1 to 3).

4. The method according to claim 2, wherein in the first method, the molar ratio of the arylamine to $R_7R_8R_9SiCl$ is 1: (1 to 3);
in the second method, the molar ratio of the arylamine to $(R_7)_mSiCl_{4-m}$ is 1: (1 to 3).

5. The method according to claim 2, wherein in the first method, the arylamine is reacted with the alkyl lithium for 1 to 48 hours; after the addition of $R_7R_8R_9SiCl$, the reaction is carried out for 1 to 48 hours;
in the second method, the arylamine is reacted with the alkyl lithium for 1 to 48 hours; the $(R_7)_mSiCl_{4-m}$ is added to continue the reaction for 24 hours; and the intermediate represented by formula III is reacted with ROH for 4 to 60 hours.

6. The method according to claim 2, wherein the alkyl lithium is butyl lithium.

7. The method according to claim 2, wherein the protective gas is nitrogen, helium or argon.

8. The method according to claim 2, wherein the organic solvent is one or a mixed solvent of toluene, benzene, diethyl ether, tetrahydrofuran, pentane, hexane, heptane and octane.

9. The method according to claim 2, wherein the molar ratio of the intermediate represented by Formula III to ROH is 1: (1 to 100).

10. The method according to claim 2, wherein m is 1 and R is methyl or ethyl.

11. A propylene polymerization catalyst, wherein the propylene polymerization catalyst includes a solid titanium catalyst component, an alkyl aluminum compound component, and the arylaminosilane compound component according to claim 1.

12. The propylene polymerization catalyst according to claim 11, wherein the ratio of the components in the propylene polymerization catalyst is 1: (5 to 1000): (1 to 500) in terms of the molar ratio of titanium: aluminum: silicon.

13. The propylene polymerization catalyst according to claim 11, wherein the alkyl aluminum compound is trimethylaluminum, triethylaluminum, triisobutylaluminum, trioctylaluminum, diethylaluminum hydride, diisobutylaluminum hydride, chlorodiethylaluminum, chlorodiisobutylaluminum or dichloroethylaluminum;

the solid titanium catalyst is a solid titanium catalyst with titanium, magnesium, and halogen as main components;

the solid titanium catalyst with titanium, magnesium, and halogen as the main components refers to magnesium halide, and a titanium compound having at least one Ti-halide bond and an internal electron donor compound supported thereon;

the internal electron donor compound is a polycarboxylic acid ester, an acid anhydride, a ketone, an ether, or a sulfonyl compound.

* * * * *